US012717720B2

(12) United States Patent
Danday et al.

(10) Patent No.: US 12,717,720 B2
(45) Date of Patent: Aug. 25, 2026

(54) CACHING PAGES IN COMPUTE REPLICAS BASED ON AGGREGATE USAGE OF PAGES ACROSS THE COMPUTE REPLICAS

(71) Applicant: Microsoft Technology Licensing, LLC, Redmond, WA (US)

(72) Inventors: Raj Kripal Danday, Bothell, WA (US); Chaitanya Gottipati, Hyderabad (IN); Ankit Anvesh, Bengaluru (IN); Alejandro Hernandez Saenz, Kirkland, WA (US); Rogerio Ramos, Redmond, WA (US); Kareem Aladdin Golaub, Seattle, WA (US); Harshil Ambagade, Bengaluru (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 99 days.

(21) Appl. No.: 18/669,922

(22) Filed: May 21, 2024

(65) Prior Publication Data

US 2025/0363057 A1 Nov. 27, 2025

(51) Int. Cl.
*G06F 12/0842* (2016.01)
*G06F 12/0882* (2016.01)

(52) U.S. Cl.
CPC ...... *G06F 12/0842* (2013.01); *G06F 12/0882* (2013.01); *G06F 2212/6042* (2013.01)

(58) Field of Classification Search
CPC ............. G06F 12/0842; G06F 12/0882; G06F 2212/6042
See application file for complete search history.

(56) References Cited

U.S. PATENT DOCUMENTS 6,085,193 A 7/2000 Malkin
9,766,824 B2 * 9/2017 Matsuzawa ........... G06F 3/0655
2003/0105857 A1 6/2003 Kamen
2012/0054444 A1 * 3/2012 Wang .................... G06F 12/127 711/E12.001
2014/0297950 A1 * 10/2014 Kuwayama ........... G06F 3/0653 711/114

(Continued)

OTHER PUBLICATIONS

Levandoski, et al., "Identifying Hot and Cold Data in Main-Memory Databases", In IEEE 29th International Conference on Data Engineering (ICDE), 2013, 12 pages.

(Continued)

*Primary Examiner* — Aracelis Ruiz

(57) ABSTRACT

Systems, methods, apparatuses, and computer program products are disclosed for caching pages in a compute replica of a set of compute replicas. Page statistics associated with requests to read or write pages are maintained at a first compute replica of a set of compute replicas. A subset of the page statistics associated with pages served by a page server are provided to the page server. The first compute replica receives, from the page server, a set of aggregate page statistics associated with pages served by the page server, the aggregate page statistics including aggregate page access frequencies of the pages by the set of compute replicas. The first compute replica determines, based on the set of aggregate page statistics, frequently accessed pages that are missing from a cache of the first compute replica, and obtains, from the page server, the missing pages.

20 Claims, 9 Drawing Sheets

(56) References Cited

U.S. PATENT DOCUMENTS

| | | | | |
|---|---|---|---|---|
| 2015/0379035 | A1* | 12/2015 | Noronha | G06F 12/0802 707/736 |
| 2020/0133668 | A1* | 4/2020 | Chen | G06F 3/065 |

OTHER PUBLICATIONS

Extended European Search Report Received in European Patent Application No. 25174777.0 mailed on Oct. 6, 2025, 10 pages.

* cited by examiner

CACHING PAGES IN COMPUTE REPLICAS BASED ON AGGREGATE USAGE OF PAGES ACROSS THE COMPUTE REPLICAS

BACKGROUND

In database management systems, cache priming is a process of preloading frequently accessed data pages to optimize query performance. By anticipating and preloading data pages into the cache, subsequent queries can be serviced more quickly, as the required information is already available in the cache memory, reducing the need for time-consuming disk accesses or network transfers. Cache priming strategies often involve analyzing historical access patterns and/or employing predictive algorithms to identify and prioritize the data or resources most likely to be accessed in the near future.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, apparatuses, and computer program products are disclosed for caching pages in a compute replica of a set of compute replicas. Page statistics associated with requests to read or write pages are maintained at a first compute replica of a set of compute replicas. A subset of the page statistics associated with pages served by a page server are provided to the page server. The first compute replica receives, from the page server, a set of aggregate page statistics associated with pages served by the page server, the aggregate page statistics including aggregate page access frequencies of the pages by the set of compute replicas. The first compute replica determines, based on the set of aggregate page statistics, frequently accessed pages that are missing from a cache of the first compute replica, and obtains, from the page server, the missing pages.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
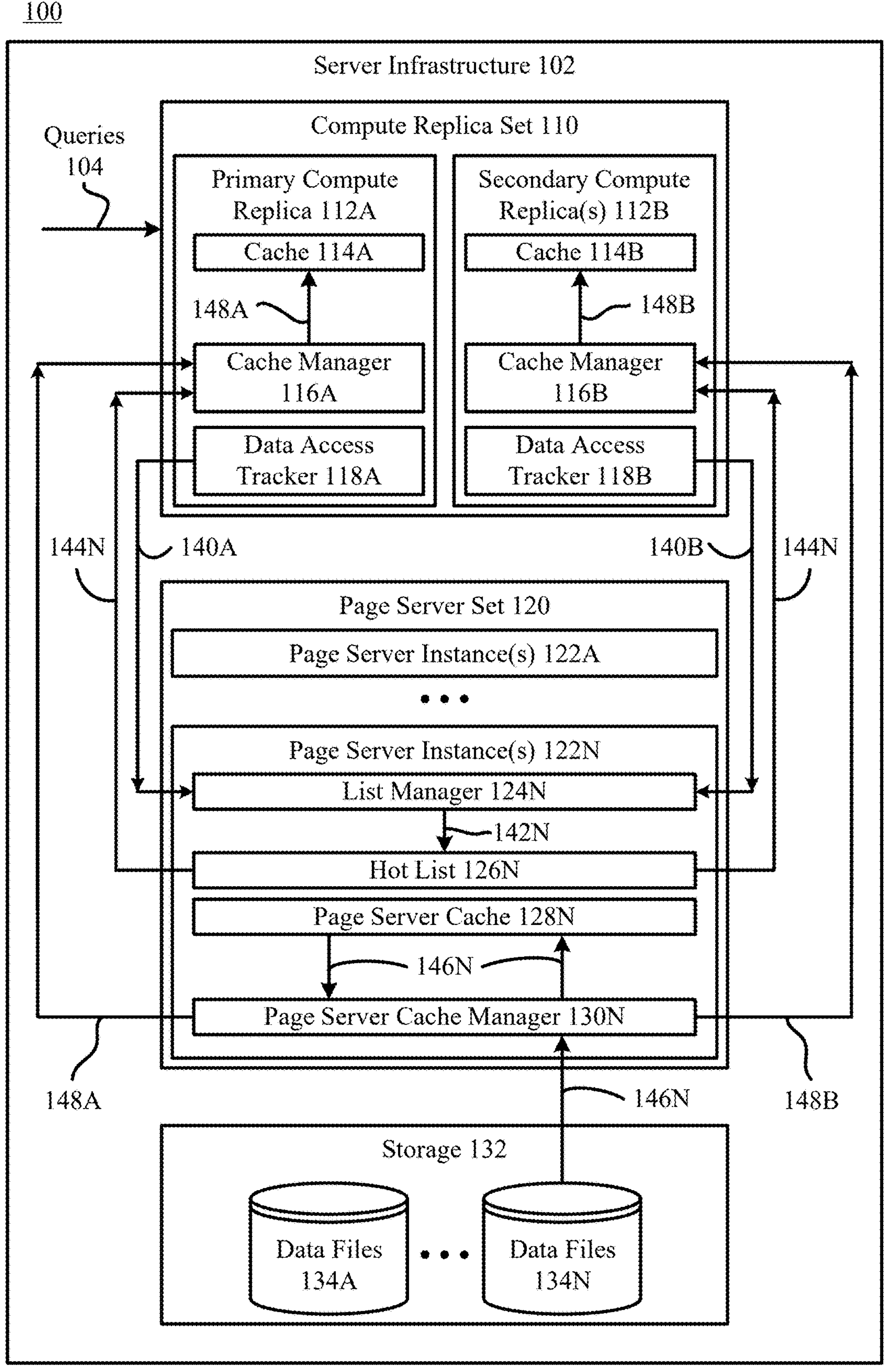
FIG. 1 shows a block diagram of an example system for caching pages in compute replicas based on aggregate usage of the pages across the compute replicas, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Scalable database systems are designed to seamlessly adapt to fluctuating demands by adding additional resources when needed. For instance, horizontal scaling can be employed to add additional resources by distributing a workload across multiple servers or nodes. In embodiments, scalable database systems are implemented using a master-slave architecture that includes a set of compute replicas, including a primary compute replica that performs all write operations and updates to the database, and one or more secondary compute replicas that perform read operations on the database. In embodiments, the primary compute replica can also perform read operations on the database. This type of architecture enhances scalability and fault tolerance, as read-heavy workloads can be distributed across multiple secondary compute replicas, and in case of failure of the primary compute replica, one of the secondary compute replicas can be promoted to become the new primary compute replica, ensuring uninterrupted availability of the database system.

In embodiments, data of the database is stored in a distributed manner across a plurality of storages managed by a plurality of page servers. For instance, the data is stored as a set of pages, where the page servers serve a particular range of pages. In order to increase data availability (e.g., in case of failover), in embodiments, a plurality of page server instances can serve a particular range of pages in a replicated fashion.

Embodiments disclosed herein are directed to preloading a cache of the primary and/or secondary compute replicas based on an aggregate page usage by the set of compute replicas. In embodiments, preloading a cache of a secondary compute replica with pages frequently accessed by the set of compute replicas reduces potential performance degradations that might occur during failover events. For instance, priming the cache of a secondary compute replica with pages frequently accessed by other compute replicas (e.g., primary compute replica), the secondary compute node can, in the event of a failover promotion, immediately begin processing requests as the new primary compute replica without delays associated with fetching data from disk or remote sources.

In embodiments, primary and/or secondary compute replicas of the set of compute replicas maintain page statistics for requests to read or write pages. Page statistics, in embodiments, are maintained locally at a compute replica based on the requests handled by the compute replica. For instance, for pages accessed by a request to read or write a page, a compute replica generates an access entry indicating the page accessed, and periodically generates timestamped access counts indicating pages accessed during a period, the number of times the pages were accessed during the period, and a timestamp associated with the period.

In embodiments, maintenance of page statistics is performed by the compute replicas using one or more buffers (e.g., ring buffers). For instance, a compute replica stores an access entry in a first buffer when a page is accessed by a request to read or write the page. In embodiments, the compute replicas process the access entries in the first buffer by swapping the first buffer with an empty buffer to reduce interruptions to the capture of page access events. In embodiments, the first buffer is swapped with an empty buffer periodically or when it is determined that the first buffer satisfies a utilization threshold (e.g., based on a resource utilization, an elapsed time period, access entry creation rate, etc.). Once the first buffer is swapped with the empty buffer, a compute replica, in embodiments, generates a timestamped snapshot of the first buffer that includes the access entries in the first buffer and a timestamp associated with the snapshot (e.g., timestamp when the snapshot was taken). Based on the timestamped snapshot, the compute replica, in embodiments, generates timestamped access counts that include the timestamp of the snapshot, the pages accessed during a period captured by the snapshot, and a count of a number of times the pages were accessed during the period captured by the snapshot. In embodiments, the compute replica stores the generated timestamped access counts in a second buffer (e.g., ring buffer) for future transmission to page servers serving the accessed pages.

In embodiments, the compute replica separates the timestamped access counts based on page ranges associated with one or more page server. For instance, a compute replica determines the page ranges served by the page servers, separates the timestamped access counts according to the page ranges served by the page server, and provides the separated timestamped access counts to the page servers serving pages in the page ranges. In embodiments, the compute replica serializes the separated timestamped access counts and provides the serialized timestamped access counts to the respective page servers serving the page ranges. In embodiments, the timestamped access counts are provided to the respective page servers periodically and/or when it is determined that the second buffer satisfies a utilization threshold (e.g., based on a resource utilization, an elapsed time period, access entry creation rate, etc.). In embodiments, the timestamped access counts are provided to the page server instances that serve the page range.

In embodiments, data of the database is served in a distributed manner by a plurality of page servers, where each page server serves pages within a page range. In embodiments, a page server serving pages in a particular page range receives, from compute replicas of the set of compute replicas, page statistics associated with pages served by the page server. For instance, a page server receives, from the set of compute replicas, timestamped access counts that are associated with pages within the page range served by the page server. In embodiments, the plurality of page servers maintains a hot list of pages that includes estimated page access frequencies that are estimated based on the page statistics received from the set of compute replicas. For instance, a page server may update the hot list of pages based on page statistics received from a compute replica.

In embodiments, a page server receives page statistics from the set of compute replicas in an asynchronous manner, where compute replicas of the set of compute replicas provide page statistics to the page server at the same and/or different times. Upon receiving new page statistics from a compute replica of the set of compute replicas, the page server, in embodiments, updates the hot list of pages by recalculating the estimated page access frequencies based on the new page statistics. In embodiments, the page server recalculates the estimated page access frequencies by applying an exponential smoothing function to the page statistics. For example, the page server calculates and/or recalculates an estimated page access frequency for a particular page, p, based on the following exponential smoothing function:

$$est_p(t_n) = \alpha * x_{t_n} + (1-\alpha) * est_p(t_{n-1}) \quad \text{(Eq. 1)}$$

where, $t_n$ represents a current timestamp associated with the new page statistics, $x_{t_n}$ represents an access count associated with page p in the new page statistics associated with current timestamp $t_n$, $est_p(t_{n-1})$ is the estimated page access frequency of page p from the last update time $t_{n-1}$, and $\alpha$ is a decay factor that determines the weight given to the new page statistics and how quickly to decay old page statistics. In embodiments, $\alpha$ is set in the range of 0.01 to 0.05, where higher values give more weight to new page statistics.

In embodiments, the page server recalculates the estimated page access frequencies for pages served by the page server by applying the exponential smoothing function to the page statistics associated with pages served by the page server. In embodiments, the page server recalculates the estimated page access frequencies for pages served by the page server until the updated hot list of pages converges on a set of pages served by the page server. For example, as a page server recalculates estimated page access frequencies for pages served by the page server, the page server can determine that a lower estimated page access frequency bound (i.e., cutoff) to qualify for the hot list of pages converges and that additional recalculations are unnecessary because no additional pages can satisfy the lower estimated page access frequency bound. In embodiments, a page server can discard page statistics (e.g., timestamped access counts) and/or estimated page access frequencies that are determined to be unnecessary for future calculations. For instance, a page server can determine that a page served by the page server is unlikely to satisfy a threshold for inclusion in the hot list of pages, and can discard information associated with the page.

After recalculating the estimated page access frequencies of pages, the page server, in embodiments, orders the hot list of pages based on the recalculated estimated page access frequencies. For instance, the page server updates the hot list of pages to include a predetermined number of pages having the highest recalculated estimated page access frequencies. In embodiments, the predetermined number of pages represents the size of the hot list of pages, and can include some and/or all pages served by the pager server. In embodiments, the page server provides the updated hot list of pages and/or the recalculated estimated page access frequencies to the set of compute replicas according to one or more of: a predetermined schedule, a predetermined frequency, periodically, and/or upon request by any compute replica of the set of compute replicas.

In embodiments, the set of compute replicas perform cache priming based on updated hot lists of pages received from the page servers. For instance, a compute replica of the set of compute replicas receives updated hot lists of pages from a plurality of page servers, aggregates the received updated hot lists of pages based on recalculated estimated page access frequencies, and iteratively obtains pages in the aggregate hot list of pages that are missing from a cache of the compute replica. In embodiments, the compute replica iteratively obtains pages that are on the aggregate hot list of pages that are missing from the cache until satisfaction of a predetermined termination condition, such as, but not limited to, a utilization of the cache satisfying a utilization criteria (e.g., satisfying a utilization threshold), the caching of a page missing from the cache causes the eviction of a predetermined amount of pages from the cache, and/or the like. If the compute replica iterates through the entire aggregate hot list of pages without satisfying the predetermined termination condition, the compute replica, in embodiments, obtains, for caching at the compute replica, additional pages not already in the cache, such as, but not limited to, sequential pages not already in the cache, random pages not already in the cache, and/or the like.

These and further embodiments are disclosed herein that enable the functionality described above and additional functionality. Such embodiments are described in further detail as follows.

For instance, FIG. 1 shows a block diagram of an example system for caching pages in compute replicas based on aggregate usage of the pages across the compute replicas, in accordance with an embodiment. As shown in FIG. 1, system 100 includes a server infrastructure 102, a compute replica set 110, a page server set 120, and storage 132. Additionally, compute replica set 110 includes a primary compute replica 112A and one or more secondary compute replicas 112B that respectively include a cache 114 (e.g., cache(s) 114A-114B), a cache manager 116 (e.g., cache manager(s) 116A-116B), and/or a data access tracker 118 (e.g., data access tracker(s) 118A-118B). Furthermore, page server set 120 include one or more page server instances 122A and one or more page server instances 122N that respectively include a list manager 124 (e.g., list manager(s) 124A-124N), a hot list 126 (e.g., hot list(s) 126A-126N), a page server cache 128 (e.g., page server cache(s) 128A-128N), and a page server cache manager 130 (e.g., page server cache manager(s) 130A-130N). For simplicity, internal elements (e.g., 124A, 126A, 128A, and 130A) of page server instance(s) 122A are omitted from FIG. 1. Moreover, storage 132 further includes one or more data files 134A and one or more data files 134N. System 100 is described in further detail as follows.

Server infrastructure 102 comprises a network-accessible server set (e.g., cloud-based environment or platform). In an embodiment, the underlying resources of server infrastructure 102 are co-located (e.g., housed in one or more nearby buildings with associated components such as backup power supplies, redundant data communications, environmental controls, etc.) to form a datacenter, are distributed across different regions, and/or are arranged in other manners. As shown in FIG. 1, server infrastructure 102 further includes compute replica set 110, primary compute replica 112A, secondary compute replica(s) 112B, cache(s) 114A-114B, cache manager(s) 116A-116B, data access tracker(s) 118A-118B, page server set 120, page server instance(s) 122A-122N, list manager(s) 124A-124N, hot list(s) 126A-126N, page server cache(s) 128A-128N, page server cache manager(s) 130A-130N, storage 132, and data file(s) 134A-134N. In embodiments, compute replica set 110, page server set 120, storage 132, and/or components thereof can be implemented on one or more physical devices and/or across a plurality of devices in a distributed and/or replicative manner. Various example implementations of server infrastructure 102 are described below in reference to FIG. 11 (e.g., network-based server infrastructure 1170, and/or components thereof).

Compute replica set 110 comprises a group of database compute instances (e.g., virtual machines, containers, etc.) that execute queries against a common dataset (e.g., database). In embodiments, one compute instance is designated as a primary instance (e.g., primary compute replica 112A) that handles incoming requests (e.g., queries 104) and distributes tasks among one or more secondary instances (e.g., secondary compute replica(s) 112B). In embodiments, distribution of tasks are performed by a query handler (not depicted) that distributes tasks among primary compute replica 112A and secondary compute replica(s) 112B. In the event of a failure or increased demand, compute replica set 110 can dynamically adjust by reallocating tasks among the compute instances of compute replica set 110 and/or by promoting a secondary compute replica 112B to replace primary compute replica 112A. In embodiments, compute replica set 110 executes SQL queries and/or tasks in parallel across a plurality of compute replicas (e.g., primary compute replica 112A and/or secondary compute replica(s) 112B). The distributed nature of compute replica set 110 can, in embodiments, provide increased data availability, failure tolerance, read performance, and/or scalability. Various example implementations of compute replica set 110 are described below in reference to FIG. 11 (e.g., clusters 1172, and/or components thereof).

Primary compute replica 112A and/or secondary compute replica(s) 112B comprise one or more physical and/or virtual servers (e.g., virtual machine, container, etc.) capable of executing queries and/or tasks against a database, such as, but not limited to, reading data, updating data, writing data, deleting data, moving data, filtering data, and/or the like. In embodiments, primary compute replica 112A and/or secondary compute replica(s) 112B are configured to cache data in memory in order to improve the performance of subsequent requests for the same data. In embodiments, primary compute replica 112A and/or secondary compute replica(s) 112B are located in separate locations and/or separate physical servers. As shown in FIG. 1, primary compute replica 112A and/or secondary compute replica(s) 112B include cache(s) 114A-114B, cache manager(s) 116A-116B, and/or data access tracker(s) 118A-118B. Various example implementations of primary compute replica 112A and secondary compute replica(s) 112B are described below in reference to FIG. 11 (e.g., nodes 1174, node 1146, and/or components thereof).

Cache(s) 114A-114B are configured to store frequently accessed data pages retrieved from disk to minimize costly disk I/O operations when processing database queries. Cache(s) 114A-114B will be described in greater detail below in conjunction with FIG. 4.

Cache manager(s) 116A-116B are configured to manage utilization of cache(s) 114A-114B, respectively. For instance, cache manager(s) 116A-116B perform various cache management functions, such as, but not limited to, determining whether data is stored in cache(s) 114A-114B, determining whether to cache data in cache(s) 114A-114B, determining data to be evicted from cache(s) 114A-114B, managing cache eviction policies for cache(s) 114A-114B, and/or the like. In embodiments, cache manager(s) 116A-116B employ various cache eviction algorithms, such as, but not limited to, least recently used (LRU), first-in-first-out (FIFO), least frequently used (LFU), most recently used (MRU), predictive algorithms (e.g., machine learning model, statistical analysis, etc.), and/or the like. In embodiments, cache manager(s) 116A-116B prime cache(s) 114A-114B based on one or more sets of aggregate page statistics 144 (e.g., set(s) of aggregate page statistics 144A-144N) received from page server instance(s) 122A-122N. For instance, cache manager(s) 116A-116B obtain one or more missing pages 146A-146B from page server instance(s) 122A-122N and/or data file(s) 134A-134N based on missing pages 148A-148N being included in set(s) of aggregate page statistics 144A-144N and missing from cache(s) 114A-114B.

Data access tracker(s) 118A-118B are configured to track pages accessed by requests that read or write pages handled by compute replica(s) 112A-112B, and providing page statistics 140A-140B to page server instance(s) 122A-122N. In embodiments, data access tracker(s) 118A-118B maintain page statistics using one or more buffers (e.g., ring buffers). For instance, data access tracker(s) 118A-118B store an access entry in a first buffer when a page is accessed by a request to read or write the page.

In embodiments, data access tracker(s) 118A-118B process the access entries in the first buffer by swapping the first buffer with an empty buffer to reduce interruptions to the capture of page access events. In embodiments, data access tracker(s) 118A-118B swap the first buffer with an empty buffer periodically and/or when it is determined that the first buffer satisfies a utilization threshold (e.g., based on a resource utilization, an elapsed time period, access entry creation rate, etc.). Once the first buffer is swapped with the empty buffer, data access tracker(s) 118A-118B, in embodiments, generate a timestamped snapshot of the first buffer that includes the access entries in the first buffer and a timestamp associated with the snapshot (e.g., a time when the snapshot was taken). Based on the timestamped snapshot, data access tracker(s) 118A-118B, in embodiments, generate timestamped access counts that include the timestamp of the snapshot, the pages accessed during a period captured by snapshot, and a count of a number of times the pages were accessed during the period captured by the snapshot. In embodiments, the data access tracker(s) 118A-118B store the generated timestamped access counts in a second buffer (e.g., ring buffer) for future transmission to page server instance(s) 122A-122N as page statistics 140A-140B. Data access tracker(s) 118A-118B will be described in greater detail below in conjunction with FIG. 2.

Page server set 120 comprise one or more physical and/or virtual servers configured to manage storage and retrieval of pages from data file(s) 134A-134N residing on storage 132. In embodiments, page server set 120 include a plurality of page server instance(s) 122A-122N that serve separate page ranges. In embodiments, a plurality of page server instance(s) 122A-122N serve the same page range in order to provide failover protection in case a page server instance fails and/or becomes unreachable. Various example implementations of page server set 120 are described below in reference to FIG. 11 (e.g., on-premises servers 1192, clusters 1172, nodes 1174, node 1146, and/or components thereof).

Page server instance(s) 122A-122N are configured to manage storage and retrieval of pages falling within a page range. In embodiments with small datasets, any of page server instance(s) 122A-122N can serve an entire page range of a dataset. As shown in FIG. 1, page server instance(s) 122A-122N, in embodiments, respectively include list manager(s) 124A-124N, hot list(s) 126A-126N, page server cache(s) 128A-128N, and/or page server cache manager(s) 130A-130N. In embodiments, page server instance(s) 122A-122N are deployed, allocated additional resources, allocated fewer resources, and/or undeployed dynamically based on one or more factors, such as, but not limited to, a demand for one or more pages of the dataset, a utilization of one or more page server set 120 and/or page server instance(s) 122A-122N, a size of the dataset served by page server instance(s) 122A-122N, a number of data files(s) 134A-134N associated with the dataset served by page server instance(s) 122A-122N, a number of pages served by page server instance(s) 122A-122N, and/or the like.

List manager(s) 124A-124N are configured to manage hot list(s) 126A-126N based on page statistics 140A-140B received from data access tracker(s) 118A-118B. For instance, list manager(s) 124A-124N receive, as part of page statistics 140A-140B, timestamped access counts that include a timestamp associated with a time period, the pages accessed during the time period, and a count of a number of times the pages were accessed during the time period. In embodiments, list manager(s) 124A-124N calculate and/or recalculate an estimated page access frequency by applying an exponential smoothing function on the timestamped access counts. For instance, list manager(s) 124A-124N estimate a page access frequency for pages in hot list(s) 126A-126N by applying, to pages served by page server instance(s) 122A-122N, a decay factor, $\alpha$, that determines the weight given to the new timestamped access counts and how quickly to decay older timestamped access counts. In embodiments, $\alpha$ is set in the range of 0.01 to 0.05, where higher values give more weight to new timestamped access counts. In embodiments, list manager(s) 124A-124N access previously estimated page access frequencies for pages in hot list(s) 126A-126N, calculate updated estimated page access frequencies 142A-142N for the pages based on the previously accessed estimated page access frequencies and the newly received timestamped access counts, and update hot list(s) 126A-126N based on the updated estimated page access frequencies 142A-142N.

Hot list(s) 126A-126N are configured to maintain a list of pages served by page server instance(s) 122A-122N storing hot list(s) 126A-126N, respectively, based on the estimated page access frequencies of the pages. In embodiments, hot list(s) 126A-126N include a listing of some or all of the pages served by page server instance(s) 122A-122N storing hot list(s) 126A-126N, including, but not limited to, all pages served by page server instance(s) 122A-122N, a predetermined number of pages served by page server instance(s) 122A-122N with the highest estimated page access frequencies, pages served by page server instance(s) 122A-122N that satisfy a cutoff condition (e.g., an estimated page access frequency threshold), and/or the like. In embodiments, hot list(s) 126A-126N comprise page identifiers of pages in hot list(s) 126A-126N, and an estimated page access frequency for pages in hot list(s) 126A-126N.

Page server cache(s) 128A-128N are configured to cache frequently accessed data pages retrieved from data file(s) 134A-134N to minimize costly disk I/O operations when fulfilling page requests. Page server cache(s) 128A-128N will be described in greater detail below in conjunction with FIG. 4.

Page server cache manager(s) 130A-130N are configured to manage utilization of page server cache(s) 128A-128N, respectively. For instance, page server cache manager(s) 130A-130N perform various cache management functions, such as, but not limited to, determining whether pages are stored in page server cache(s) 128A-128N, determining whether to cache a page in page server cache(s) 128A-128N, determining data to be evicted from page server cache(s) 128A-128N, managing cache eviction policies for page server cache(s) 128A-128N, and/or the like. In embodiments, page server cache manager(s) 130A-130N employ various cache eviction algorithms, such as, but not limited to, least recently used (LRU), first-in-first-out (FIFO), least frequently used (LFU), most recently used (MRU), predictive algorithms (e.g., machine learning model, statistical analysis, etc.), and/or the like. In embodiments, page server cache manager(s) 130A-130N process requests to obtain one or more missing pages by obtaining missing pages 146A-146N from one or more of: page server cache(s) 128A-128N, and/or data file(s) 134A-134N stored in storage 132, and providing missing pages 146A-146N to compute replica(s) 112A-112B as missing pages 148A-148B.

Storage 132 includes one or more physical and/or logical storage nodes configured to store data file(s) 134A-134N. In embodiments, storage 132 is implemented in various ways, such as, but not limited to, as a single storage device, as a plurality of storage devices, in a distributed manner across a plurality of storage devices and/or nodes, on one or more logical storage nodes hosted on one or more physical servers of server infrastructure 102, and/or the like. Various example implementations of storage 132 are described below in reference to FIG. 11 (e.g., storage 1120, storage 1148, storage 1194, and/or components thereof).

Data file(s) 134A-134N are configured to store pages of a database. In embodiments, the data of a database is stored as one or more pages in data file(s) 134A-134N. In embodiments, page server instance(s) 122A-122N serve pages stored in data file(s) 134A-134N by accessing the data file(s) 134A-134N that contain the requested page. In embodiments, pages stored in data file(s) 134A-134N comprise a page header containing metadata about the page, a page directory and/or row offset table to facilitate efficient access to data entries, a data area storing the actual records or rows of data, and/or mechanisms for managing free space within the page, such as free space segments and/or bitmaps. In embodiments, rows of data are stored serially, starting immediately after the page header.

Figure 2:
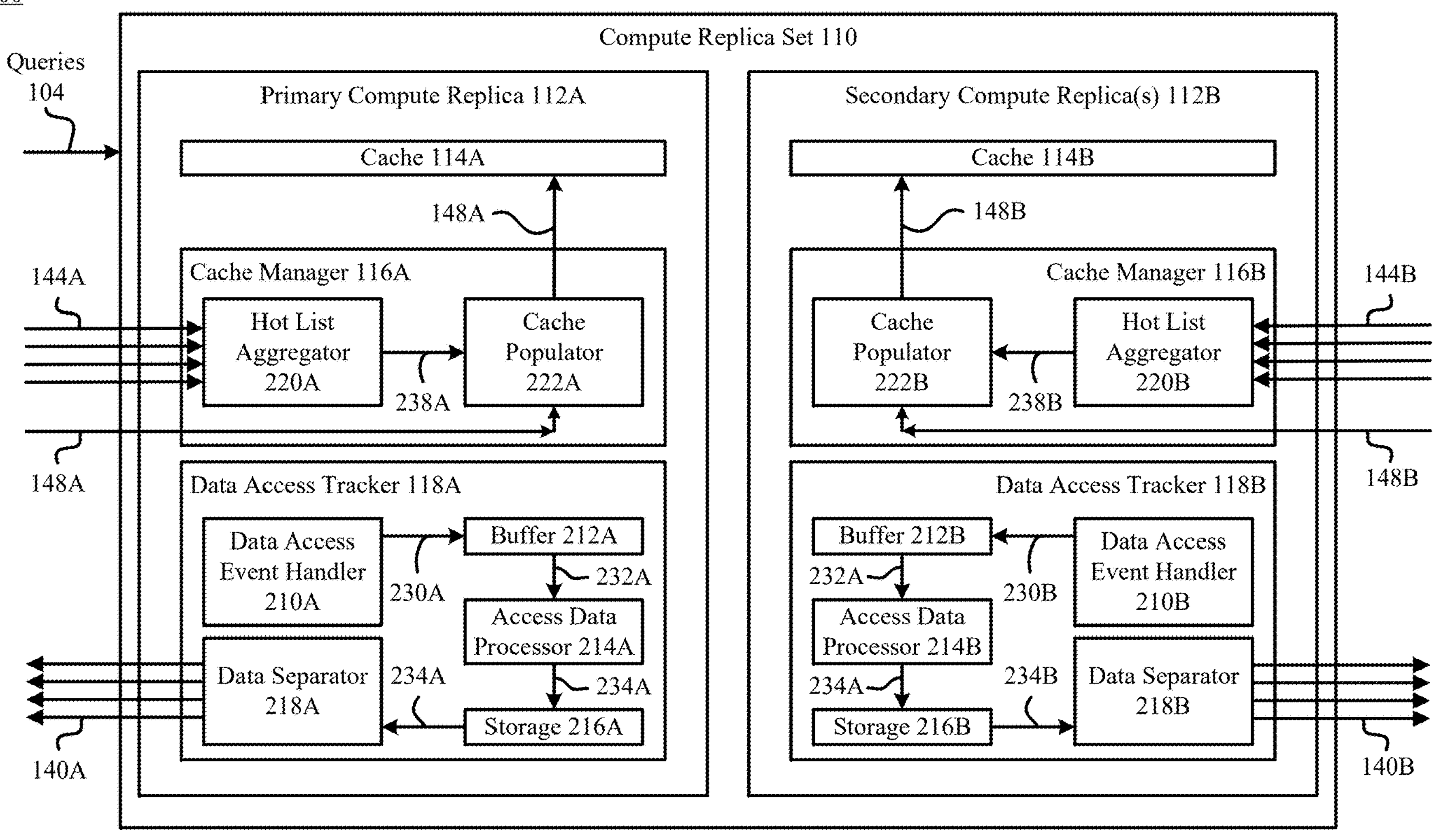
FIG. 2 shows a block diagram of an example system for providing page statistics to page servers and combining aggregate page statistics received from the page servers, in accordance with an embodiment.

Embodiments described herein may operate in various ways to provide page statistics to page servers and combining aggregate page statistics received from the page servers. For instance, FIG. 2 shows a block diagram of an example system for providing page statistics to page servers and combining aggregate page statistics received from the page servers, in accordance with an embodiment. As shown in FIG. 2, system 200 includes compute replica set 110, primary compute replica 112A, secondary compute replica(s) 112B, cache(s) 114A-114B, cache manager(s) 116A-116B, and data access tracker(s) 118A-118B. In FIG. 2, data access tracker(s) 118A-118B respectively include a data access event handler 210 (e.g., data access event handler(s) 210A-210B), a buffer 212 (e.g., buffer(s) 212A-212B), an access data processor 214 (e.g., access data processor(s) 214A-214B), a storage 216 (e.g., storage(s) 216A-216B), and a data separator 218 (e.g., data separator(s) 218A-218B). Additionally, cache manager(s) 116A-116B respectively include a hot list aggregator 220 (e.g., hot list aggregator(s) 220A-220B), and a cache populator 222 (e.g., cache populator(s) 222A-222B). System 200 is described in further detail as follows.

Data access event handler(s) 210A-210B are configured to detect requests to read or write pages handled by primary compute replica 112A and/or secondary compute replica(s) 112B, respectively, and to generate, for pages accessed by the requests, one or more access entries 230A-230B indicating the page accessed. In embodiments, data access event handler(s) 210A-210B store the access entries 230A-230B in buffer(s) 212A-212B, respectively.

Buffer(s) 212A-212B comprise portions of memory for temporarily storing access entries 230A-230B, respectively. In embodiments, buffer(s) 212A-212B are implemented as pairs of buffers (e.g., ring buffers), including a first buffer that stores access entries 230A-230B, and a second empty buffer that is swapped with the first buffer when access entries 230A-230B are processed by access data processor(s) 214A-214B. For instance, to reduce interruptions to the capture of page access events, data access tracker(s) 118A-118B, and/or components thereof, swap buffer(s) 212A-212B comprising access entries 230A-230B with empty buffer(s) 212A-212B on a periodic basis and/or when it is determined that the buffer(s) 212A-212B satisfy a utilization threshold (e.g., based on a resource utilization, an elapsed time period, access entry creation rate, etc.).

Access data processor(s) 214A-214B are configured to process access entries 230A-230B stored in buffer(s) 212A-212B, respectively, by creating one or more timestamped snapshots 232A-232B of access entries 230A-230B, and generating timestamped access counts 234A-234B based on timestamped snapshot(s) 232A-232B. For instance, access data processor(s) 214A-214B generate timestamped snapshot(s) 232A-232B that respectively comprise access entries 230A-230B stored respectively in buffer(s) 212A-212B, and a timestamp associated with the timestamped snapshot(s) 232A-232B (e.g., time when timestamped snapshot(s) 232A-232B were taken). Based on timestamped snapshot(s) 232A-232B, in embodiments, access data processor(s)

214A-214B generate corresponding timestamped access count(s) 234A-234B that comprise the timestamp of the corresponding timestamped snapshot(s) 232A-232B, the pages accessed during a period captured by timestamped snapshot(s) 232A-232B, and a count of a number of times the pages were accessed during the period captured by timestamped snapshot(s) 232A-232B. In embodiments, access data processor(s) 214A-214B store timestamped access count(s) 234A-234B in storage(s) 216A-216B, respectively.

Storage(s) 216A-216B are configured to temporarily store timestamped access count(s) 234A-234B for future transmission to page server replica(s) 122A-122N. In embodiments, storage(s) 216A-216B are implemented as memory buffers (e.g., ring buffers).

Data separator(s) 218A-218B are configured to access timestamped access count(s) 234A-234B from storage(s) 216A-216B and separate timestamped access count(s) 234A-234B based on page ranges associated with page server instance(s) 122A-122N. For instance, data separator(s) 218A-218B determine the page ranges served by page server instance(s) 122A-122N, separate timestamped access count(s) 234A-234B according to the page ranges served by page server instance(s) 122A-122N, and provide separated timestamped access count(s) as page statistics 140A-140B to page server instance(s) 122A-122N according to the page ranges. In embodiments, data separator(s) 218A-218B provide separated timestamped access count(s) 234A-234B to page server instance(s) 122A-122N on a periodic basis and/or when it is determined that the storage(s) 216A-216B satisfy a utilization threshold (e.g., based on a resource utilization, an elapsed time period, access entry creation rate, etc.).

Hot list aggregator(s) 220A-220B are configured to receive, from page server instance(s) 122A-122N, one or more sets of aggregate page statistics 144A-144B, and generate one or more aggregate hot lists 238A-238B that comprise lists of pages frequently accessed by compute replicas 112A-112B of compute replica set 110 that are ordered based on estimated page access frequencies determined by page server instance(s) 122A-122. For instance, hot list aggregator(s) 220A-220B receive, from page server instance(s) 122A-122N, set(s) of aggregate page statistics 144A-144B comprising ordered listings of pages served by page server instance(s) 122A-122N, and combine set(s) of aggregate page statistics 144A-144B based on estimated page access frequencies of pages determined by page server instance(s) 122A-122N.

Cache populator(s) 222A-222B are configured to receive aggregate hot list(s) 238A-238B from hot list aggregator(s) 220A-220B, and populate cache(s) 114A-114B based on aggregate hot list(s) 238A-238B. In embodiments, cache populator(s) 222A-222B iterate through pages listed in aggregate hot list(s) 238A-238B based on the estimated page access frequencies associated with the pages to determine whether a page in aggregate hot list(s) 238A-238B is cached in cache(s) 114A-114B. Upon determining that a page in aggregate hot list(s) 238A-238B is missing from cache(s) 114A-114B, in embodiments, cache populator(s) 222A-222B obtain missing page(s) 148A-148B from page server instance(s) 122A-122N that serve missing page(s) 148A-148B, and cache missing page(s) 148A-148B in cache(s) 114A-114B, respectively. In embodiments, cache populator(s) 222A-222B populate cache(s) 114A-114B in such a manner until a predetermined termination condition is satisfied, such as, but not limited to, a utilization of cache(s) 114A-114B satisfying a predetermined percentage of a cache size of cache(s) 114A-114B, caching a missing page missing from cache(s) 114A-114B causes eviction of another page from cache(s) 114A-114B, and/or pages identified in aggregate hot list(s) 238A-238B are cached in cache(s) 114A-114B. In embodiments, after iterating through hot list(s) 238A-238B without satisfying the predetermined termination condition, cache populator(s) 222A-222B, obtain, for caching in cache(s) 114A-114B, additional pages not already cached in cache(s) 114A-114B, such as, but not limited to, sequential pages not already cached in cache(s) 114A-114B, random pages not already cached in cache(s) 114A-114B, and/or the like.

Figure 3:
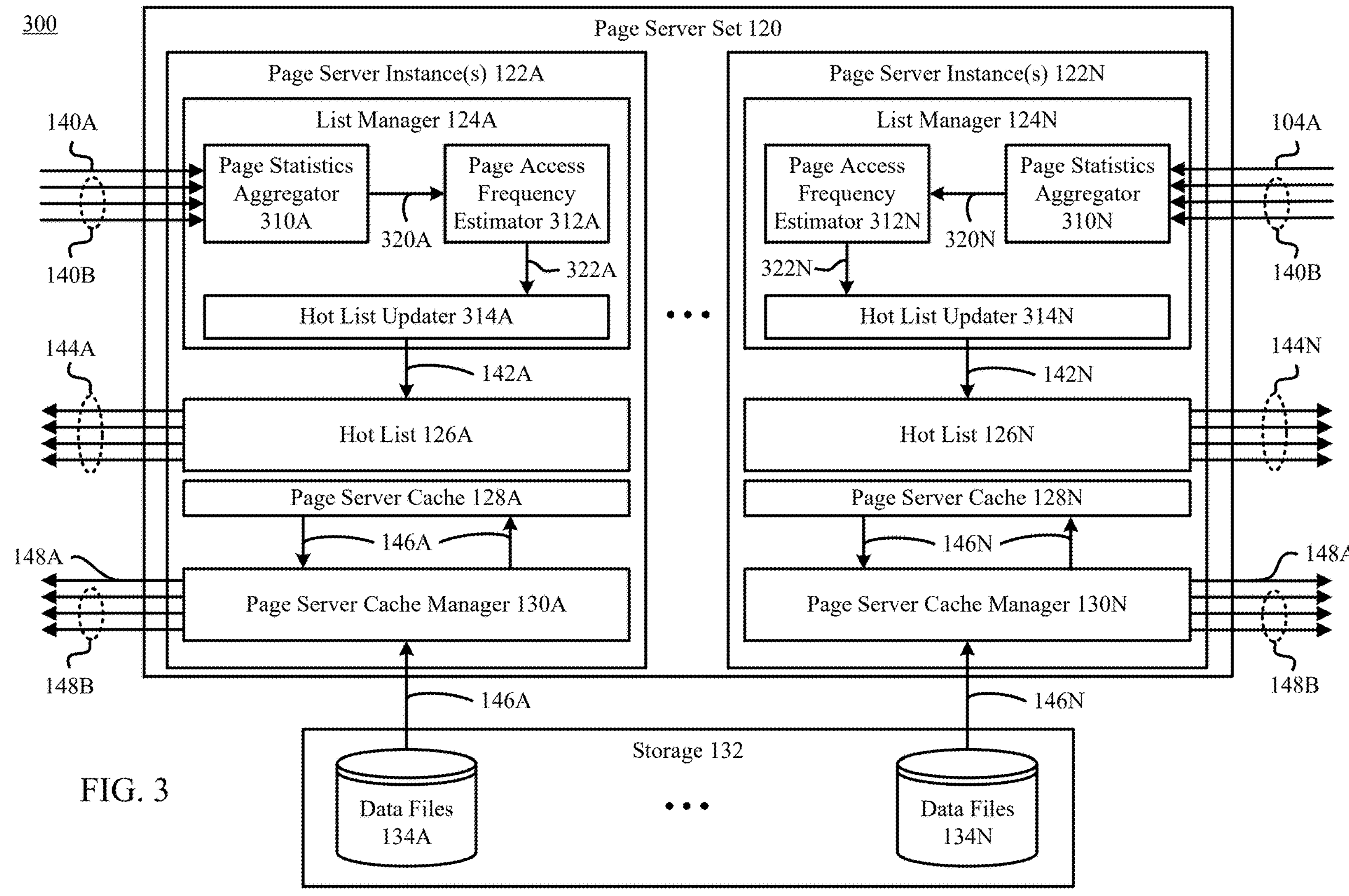
FIG. 3 shows a block diagram of an example system for receiving page statistics from compute replicas and providing aggregate page statistics to the compute replicas, in accordance with an embodiment.

Embodiments described herein may operate in various ways to receive page statistics from compute replicas and providing aggregate page statistics to the compute replicas. For instance, FIG. 3 shows a block diagram of an example system for receiving page statistics from compute replicas and providing aggregate page statistics to the compute replicas, in accordance with an embodiment. As shown in FIG. 3, system 300 includes page server set 120, page server instance(s) 122A-122N, list manager(s) 124A-124N, hot list(s) 126A-126N, page server cache(s) 128A-128N, page server cache manager(s) 130A-130N, storage 132, and data file(s) 134A-134N. In FIG. 3, list manager(s) 124A-124N respectively include a page statistics aggregator 310 (e.g., page statistics aggregator(s) 310A-310N), a page access frequency estimator 312 (e.g., page access frequency estimator(s) 312A-312N), and a hot list updater 314 (e.g., hot list updater(s) 314A-314N). System 300 is described in further detail as follows.

Page statistics aggregator(s) 310A-310N are configured to generate one or more aggregate timestamped access counts 320A-320N based on page statistics 140A-140B received from compute replica(s) 112A-112B of compute replica set 110. For instance, page statistics aggregator(s) 310A-310N receive, from compute replica(s) 112A-112B of compute replica set 110, timestamped access count(s) associated with pages served by page server instance(s) 122A-122N. In embodiments, page statistics aggregator(s) 310A-310N aggregate timestamped access count(s) received from compute replica(s) 112A-112B of compute replica set 110 by combining (e.g., adding, adding weighted based on timestamp, etc.) timestamped access count(s) associated with the same page identifier and/or the same timestamp.

Page access frequency estimator(s) 312A-312N are configured to estimate one or more estimated page access frequencies 322A-322N for pages served by page server instance(s) 122A-122N, respectively, based on aggregate timestamped access count(s) 320A-320N. In embodiments, page access frequency estimator(s) 312A-312N calculate and/or recalculate estimated page access frequencies 322A-322N by applying an exponential smoothing function on aggregate timestamped access count(s) 320A-320N. For instance, page access frequency estimator(s) 312A-312N calculate estimated page access frequencies 322A-322N for pages in hot list(s) 126A-126N by applying, to pages served by page server instance(s) 122A-122N, a decay factor, a, that determines the weight given to new aggregate timestamped access count(s) 320A-320N and how quickly to decay older aggregate timestamped access count(s) 320A-320N. In embodiments, $\alpha$ is set in the range of 0.01 to 0.05, where higher values give more weight to new timestamped access counts. In embodiments, page access frequency estimator(s) 312A-312N calculate updated estimated page access frequencies 322A-322N for the pages based on previously estimated page access frequencies 322A-322N and new aggregate timestamped access count(s) 320A-320N.

Hot list updater(s) 314A-314N are configured to receive updated estimated page access frequencies 322A-322N from page access frequency estimator(s) 312A-312N, respectively, and update hot list(s) 126A-126N, respectively. In embodiments, hot list updater(s) 314A-314N analyze the updated estimated page access frequencies 322A-322N received from page access frequency estimator(s) 312A-312N to determine pages to include in hot list(s) 126A-126N. For instance, hot list updater(s) 314A-314N determine, based on the updated estimated page access frequencies 322A-322N, a predetermined number of pages with the highest estimated page access frequencies 322A-322N, and/or pages with estimated page access frequencies 322A-322N that satisfy a cutoff condition (e.g., estimated page access frequency threshold). In embodiments, hot list updater(s) 314A-314N provide updated hot list(s) 126A-126N to compute replica(s) 112A-112B of compute replica set 110 after updating hot list(s) 126A-126N and/or on a periodic basis.

Figure 4:
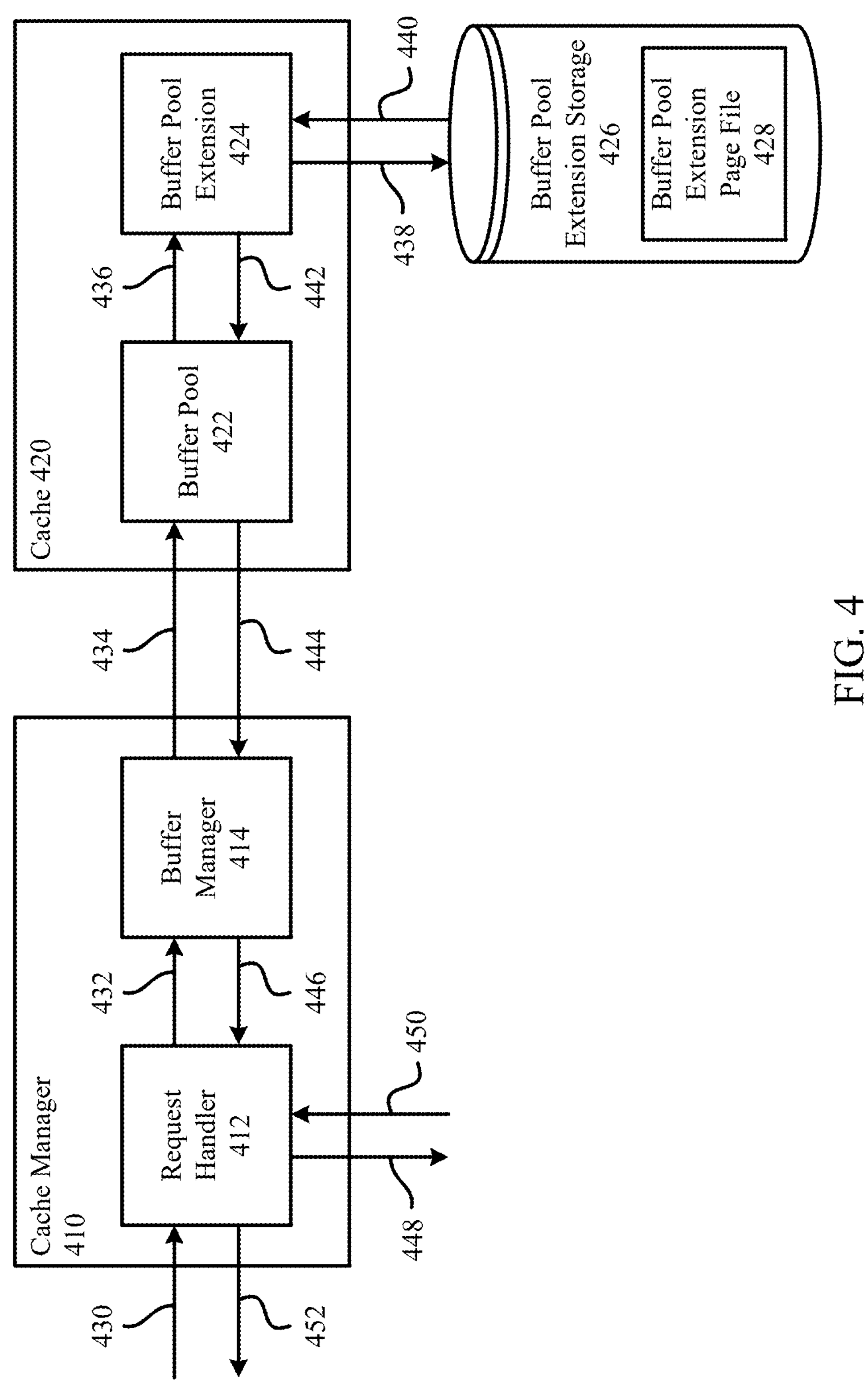
FIG. 4 shows a block diagram of an example system for caching pages on a cache comprising a buffer pool and a buffer pool extension, in accordance with an embodiment.

Embodiments described herein may operate in various ways to cache pages on a cache comprising a buffer pool and a buffer pool extension. For instance, FIG. 4 shows a block diagram of an example system for caching pages on a cache comprising a buffer pool and a buffer pool extension, in accordance with an embodiment. As shown in FIG. 4, system 400 includes a cache manager 410, a cache 420, and a buffer pool extension storage 426. In embodiments, cache manager 410 is an example of cache manager(s) 116A-116B and/or page server cache manager(s) 130A-130N, and cache 420 is an example of cache(s) 114A-114B, and/or page server cache(s) 128A-128N. In FIG. 4, cache manager 410 further includes a request handler 412 and a buffer manager 414, cache 420 further includes a buffer pool 422 and a buffer pool extension 424. Additionally, buffer pool extension storage 426 further includes one or more buffer pool extension page files 428. System 400 is described in further detail as follows.

Cache manager 410 is configured to manage utilization of cache 420 to reduce the need to access data from remote storage. In embodiments, cache manager 410 performs various cache management functions, such as, but not limited to, determining whether data is stored in cache 420, determining whether to cache data in cache 420, determining data to be evicted from cache 420, managing cache eviction policies for cache 420, and/or the like. In embodiments, cache manager 410 employs various cache eviction algorithms, such as, but not limited to, least recently used (LRU), first-in-first-out (FIFO), least frequently used (LFU), most recently used (MRU), predictive algorithms (e.g., machine learning model, statistical analysis, etc.), and/or the like.

Cache 420 comprises a multilevel cache comprising a first level (L1) cache (e.g., buffer pool 422) implemented on physical memory (e.g., DRAM, etc.), and a second level (L2) cache (e.g., buffer pool extension 424) implemented on storage (e.g., buffer pool extension storage 426, solid-state drive (SSD), etc.). In embodiments, frequently accessed (i.e., hot) data pages are stored in the first level cache (e.g., buffer pool 422) of cache 420, and less frequently accessed (e.g., lukewarm) data pages are stored in the second level cache (e.g., buffer pool extension 424 and/or buffer pool extension storage 426).

Request handler 412 is configured to handle requests 430 to read or write pages. In embodiments, request handler 412 handles a request 430 to read a page by providing a request 432 to buffer manager 414 to determine whether the requested page is cached in cache 420. If the requested page is cached in cache 420, request handler 412, in embodiments, receives a response 446 containing the requested page, and returns the requested page via a response 452. If the requested page is missing from cache 420, request handler 412, in embodiments, receives a response 446 indicating that the requested page is missing from cache 420, and transmits a request 448 to retrieve the requested page from another source (e.g., page server set 120, storage 132, etc.). In embodiments, request handler 412 receives the requested page via a response 450 from the other source, and returns the requested page via response 452. In embodiments, request handler 412 provides, via a request 432, the requested page to buffer manager 414 for possible caching on cache 420.

In embodiments, request handler 412 handles a request 430 to write a page by providing a request 432 to buffer manager 414 to determine whether the target page is cached in cache 420. If the target page is cached in cache 420, request handler 412, in embodiments, receives a response 446 indicating that the target page has been written to cache 420, and returns a response 452 indicating that the target page has been successfully written. In embodiments, the target page is marked as dirty to indicate that the page has been modified or updated but not yet written back to the underlying database storage. If the target page is not cached and/or cannot be cached in cache 420, request handler 412, in embodiments, receives a response 446 indicating that the target page is not cached and/or cannot be cached in cache 420, and transmits a request 448 to write the target page to another source (e.g., page server set 120, storage 132, etc.). In embodiments, request handler 412 receives a response 450 from the other source indicating that the target page has been successfully written, and returns a response 452 indicating that the target page has been successfully written.

Buffer manager 414 is configured to manage utilization of cache 420 to reduce the need to access data from remote storage. In embodiments, buffer manager 414 performs various cache management functions, such as, but not limited to, determining whether data is stored in cache 420 (e.g., in buffer pool 422, and/or buffer pool extension 424), determining whether to cache data in cache 420 (e.g., in buffer pool 422, and/or buffer pool extension 424), determining data to be evicted from cache 420 (e.g., in buffer pool 422, and/or buffer pool extension 424), managing cache eviction policies for cache 420 (e.g., deleting evicted pages, moving pages evicted from buffer pool 422 to buffer pool extension 424, etc.), and/or the like. In embodiments, buffer manager 414 employs various cache eviction algorithms, such as, but not limited to, least recently used (LRU), first-in-first-out (FIFO), least frequently used (LFU), most recently used (MRU), predictive algorithms (e.g., machine learning model, statistical analysis, etc.), and/or the like.

In embodiments, buffer manager 414 handles requests 432 to read or write pages from cache 420. For instance, buffer manager 414 handles requests 432 by determining whether the page is cached in cache 420. If the page is cached in cache 420, buffer manager 414 responds to a request 432 to read a page, in embodiments, by providing, to cache 420, a request 434 for the requested page, receiving the requested page via a response 444 from cache 420, and returning the requested page via a response 446. If the page is cached in cache 420, buffer manager 414 responds to a request 432 to write a page, in embodiments, by providing, to cache 420, a request 434 to write the target page, receiving, via a response 444 from cache 420, an indication that the target page was successfully written to cache 420, and returning, via a response 446, an indication that a request 432 to write a page was successful. In embodiments, the target page is marked as dirty to indicate that the page has been modified or updated but not yet written back to the underlying database storage. In embodiments, after handling requests 432 to read or write pages, buffer manager 414 determines that the affected page should be promoted from buffer pool extension 424 to buffer pool 422, and moves the affected page from buffer pool extension 424 to buffer pool 422. In embodiments, in moving the affected page from buffer pool extension 424 to buffer pool 422, buffer manager 414 also evicts another page from buffer pool 422, either by moving the evicted page to buffer pool extension 424 or by deleting the evicted page entirely from cache 420.

Buffer pool 422 is configured to temporarily store frequently accessed pages in memory. By maintaining a pool of frequently accessed data pages in memory, buffer pool 422 facilitates quicker access to data and improves the overall efficiency of database operations by reducing the need for costly disk I/O operations. In embodiments, buffer pool 422 reads and/or writes pages in buffer pool extension 424 via one or more requests 436 and one or more responses 442. In embodiments, buffer pool 422 moves pages to and/or from buffer pool extension 424 via requests 436 and responses 442.

Buffer pool extension 424 is configured to extend buffer pool 422 beyond the physical memory by utilizing storage on disk (e.g., buffer pool extension storage 426). In embodiments, when buffer pool 422 reaches its memory limit, less frequently accessed data pages are moved to buffer pool extension 424, freeing up memory for more critical data. In embodiments, buffer pool extension 424 processes requests to read and/or write pages in buffer pool extension page file(s) 428 stored in buffer pool extension storage 426 via one or more requests 438 and one or more responses 440.

Buffer pool extension storage 426 is configured to store buffer pool extension page file(s) 428 comprising pages cached in buffer pool extension 424. In embodiments, buffer pool extension storage 426 is implemented using solid state drives (SSDs) comprising flash memory (e.g., NAND chips, etc.) that are faster than traditional hard disk drives (HDDs). In embodiments, buffer pool extension storage 426 is implemented using various types of storage, such as, but not limited to, SSDs, HDDs, flash drives, memory cards, and/or the like.

Buffer pool extension page file(s) 428 are configured to store pages cached in buffer pool extension 424. In embodiments, when pages are accessed (e.g., read and/or write), the pages are fetched from buffer pool extension page file(s) 428, allowing them to be processed by the system, and modifications made to these pages are, in embodiments, written back to buffer pool extension page file(s) 428.

Figure 5:
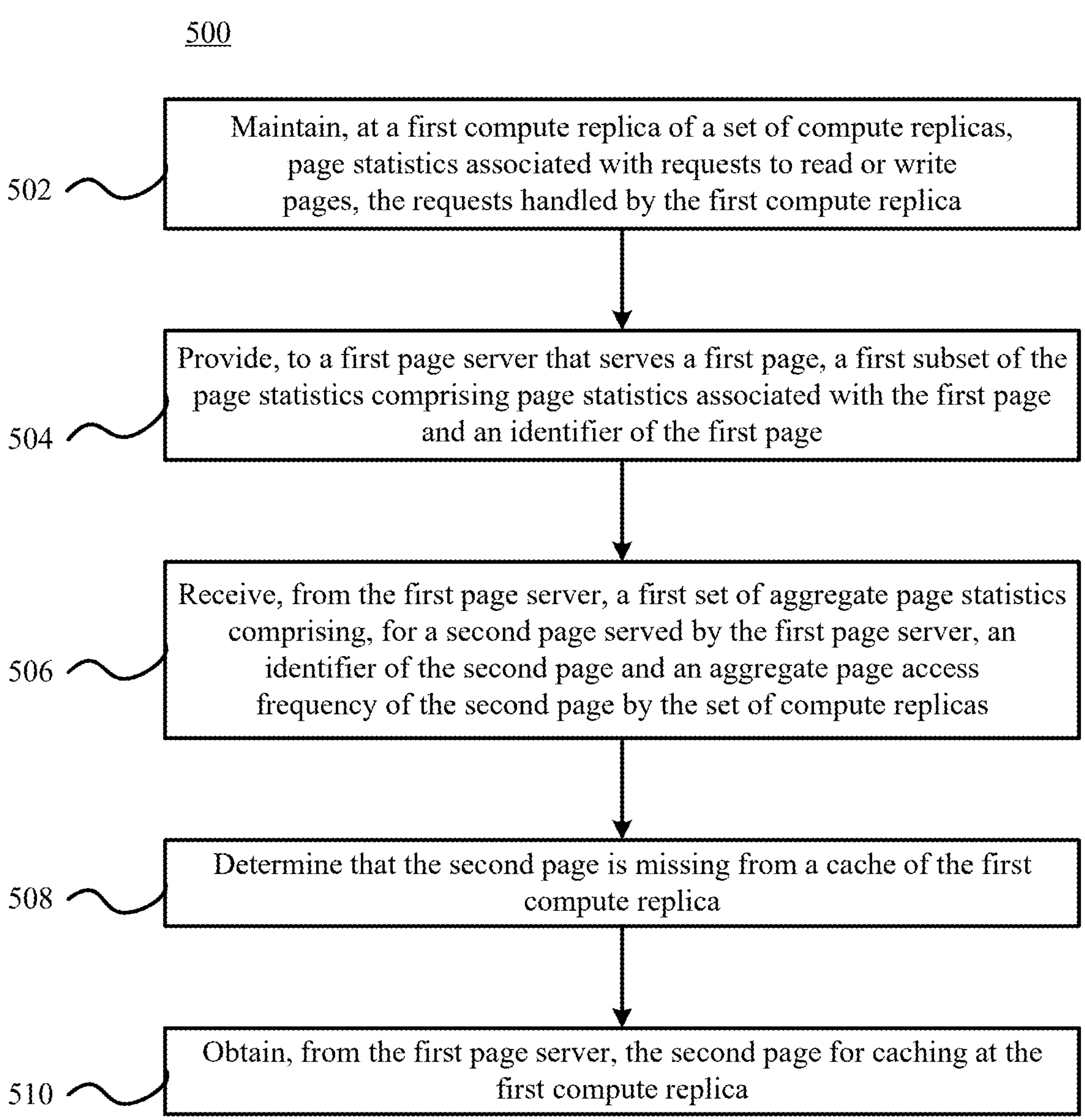
FIG. 5 depicts a flowchart of a process for caching pages in a compute replica based on aggregate access of the pages across a set of compute replicas, in accordance with an embodiment.

Embodiments described herein may operate in various ways to cache pages in a compute replica based on aggregate access of the pages across a set of computer replicas. For instance, FIG. 5 depicts a flowchart of a process for caching pages in a compute replica based on aggregate access of the pages across a set of computer replicas, in accordance with an embodiment. Compute replica set 110, primary compute replica(s) 112A-112B, cache(s) 114A-114B, cache manager(s) 116A-116B, data access tracker(s) 118A-118B, data access event handler(s) 210A-210B, buffer(s) 212A-212B, access data processor(s) 214A-214B, storage(s) 216A-216B, data separator(s) 218A-218B, hot list aggregator(s) 220A-220B, cache populator(s) 222A-222B, cache manager 410, request handler 412, buffer manager 414, cache 420, buffer pool 422, buffer pool extension 424, buffer pool extension storage 426, and/or buffer pool extension page file(s) 428 may, for example, operate according to flowchart 500. Note that not all steps of flowchart 500 may need to be performed in all embodiments, and in some embodiments, the steps of flowchart 500 may be performed in different orders than shown. Flowchart 500 is described as follows with respect to FIGS. 1-4 for illustrative purposes.

Flowchart 500 starts at step 502. In step 502, page statistics associated with requests to read or write pages are maintained at a first compute replica of a set of compute replicas, the requests handled by the first compute replica. For example, data access tracker(s) 118A-118B maintain, for requests to read or write pages handled by compute replica(s) 112A-112B, page statistics (e.g., timestamped access count(s) 234A-234B) in storage(s) 216A-216B. In embodiments, timestamped access count(s) 234A-234B comprise the timestamp of the corresponding timestamped snapshot(s) 232A-232B used to generate timestamped access count(s) 234A-234B, page identifiers of the pages accessed during a period captured by timestamped snapshot(s) 232A-232B, and a count of a number of times the pages were accessed during the period captured by timestamped snapshot(s) 232A-232B.

In step 504, a first subset of the page statistics is provided to a first page server that serves a first page, the first subset of the page statistics comprising page statistics associated with the first page and an identifier of the first page. For example, data separator(s) 218A-218B determine the page ranges served by page server instance(s) 122A-122N, separate timestamped access count(s) 234A-234B according to the page ranges served by page server instance(s) 122A-122N, and provide separated timestamped access count(s) as page statistics 140A-140B to page server instance(s) 122A-122N according to the page ranges served by page server instance(s) 122A-122N. In embodiments, data separator(s) 218A-218B provide separated timestamped access count(s) 234A-234B to page server instance(s) 122A-122N on a periodic basis and/or when it is determined that the storage(s) 216A-216B satisfy a utilization threshold (e.g., based on a resource utilization, an elapsed time period, access entry creation rate, etc.).

In step 506, a first set of aggregate page statistics is received from the first page server, the first set of aggregate page statistics comprising, for a second page served by the first page server, an identifier of the second page and an aggregate page access frequency of the second page by the set of compute replicas. For example, hot list aggregator(s) 220A-220B receive, from page server instance(s) 122A-122N, one or more sets of aggregate page statistics 144A-144B, respectively. In embodiments, hot list aggregator(s) 220A-220B receive, from page server instance(s) 122A-122N, respectively, set(s) of aggregate page statistics 144A-144B comprising ordered listings of pages served by page server instance(s) 122A-122N, respectively.

In step 508, the second page is determined to be missing from a cache of the first compute replica. For example, cache populator(s) 222A-222B iterate through pages in aggregate hot list(s) 238A-238B based on the estimated page access frequencies associated with the pages to determine whether a page in aggregate hot list(s) 238A-238B is cached in cache(s) 114A-114B, respectively.

In step 510, the second page is obtained from the first page server for caching at the first compute replica. For example, cache populator(s) 222A-222B, upon determining that a page in aggregate hot list(s) 238A-238B is missing from cache(s) 114A-114B, obtain missing page(s) 148A-148B from respective page server instance(s) 122A-122N that serve missing page(s) 148A-148B, and cache missing page(s) 148A-148B in cache(s) 114A-114B, respectively.

Figure 6:
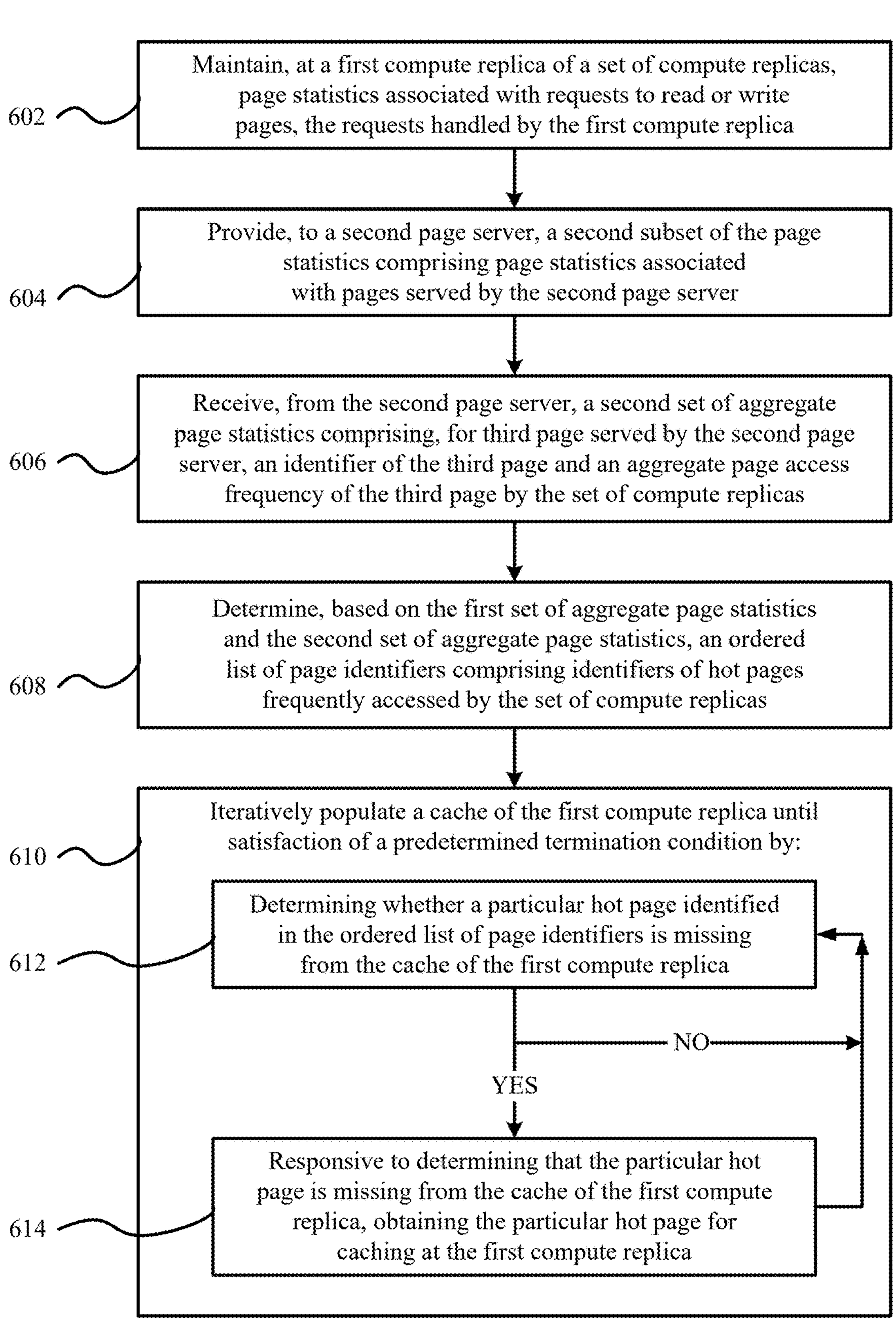
FIG. 6 depicts a flowchart of a process for iteratively populating a compute replica cache based on aggregate page statistics received from a plurality of page servers, in accordance with an embodiment.

Embodiments described herein may operate in various ways to iteratively populate a compute replica cache based on aggregate page statistics received from a plurality of page servers. For instance, FIG. 6 depicts a flowchart of a process for iteratively populating a compute replica cache based on aggregate page statistics received from a plurality of page servers, in accordance with an embodiment. Compute replica set 110, primary compute replica(s) 112A-112B, cache(s) 114A-114B, cache manager(s) 116A-116B, data access tracker(s) 118A-118B, data access event handler(s) 210A-210B, buffer(s) 212A-212B, access data processor(s) 214A-214B, storage(s) 216A-216B, data separator(s) 218A-218B, hot list aggregator(s) 220A-220B, cache populator(s) 222A-222B, cache manager 410, request handler 412, buffer manager 414, cache 420, buffer pool 422, buffer pool extension 424, buffer pool extension storage 426, and/or buffer pool extension page file(s) 428 may, for example, operate according to flowchart 600. Note that not all steps of flowchart 600 may need to be performed in all embodiments, and in some embodiments, the steps of flowchart 600 may be performed in different orders than shown. Flowchart 600 is described as follows with respect to FIGS. 1-4 for illustrative purposes.

Flowchart 600 starts at step 602. In step 602, page statistics associated with requests to read or write pages are maintained at a first compute replica of a set of compute replicas, the requests handled by the first compute replica. For example, data access tracker(s) 118A-118B maintain, for requests to read or write pages handled by compute replica(s) 112A-112B, page statistics (e.g., timestamped access count(s) 234A-234B) in storage(s) 216A-216B. In embodiments, timestamped access count(s) 234A-234B comprise the timestamp of the corresponding timestamped snapshot(s) 232A-232B used to generate timestamped access count(s) 234A-234B, page identifiers of the pages accessed during a period captured by timestamped snapshot(s) 232A-232B, and a count of a number of times the pages were accessed during the period captured by timestamped snapshot(s) 232A-232B.

In step 604, a second subset of the page statistics is provided to a second page server, the second subset of the page statistics comprising page statistics associated with pages served by the second page server. For example, data separator(s) 218A-218B determine the page ranges served by page server instance(s) 122A-122N, separate timestamped access count(s) 234A-234B according to the page ranges served by page server instance(s) 122A-122N, and provide separated timestamped access count(s) as page statistics 140A-140B to page server instance(s) 122A-122N according to the page ranges served by page server instance(s) 122A-122N. In embodiments, data separator(s) 218A-218B provide separated timestamped access count(s) 234A-234B to page server instance(s) 122A-122N on a periodic basis and/or when it is determined that the storage(s) 216A-216B satisfy a utilization threshold (e.g., based on a resource utilization, an elapsed time period, access entry creation rate, etc.).

In step 606, a second set of aggregate page statistics is received from the second page server, the second set of aggregate page statistics comprising, for a third page served by the second page server, an identifier of the third page and an aggregate page access frequency of the third page by the set of compute replicas. For example, hot list aggregator(s) 220A-220B receive, from page server instance(s) 122A-122N, one or more sets of aggregate page statistics 144A-144B, respectively. In embodiments, hot list aggregator(s) 220A-220B receive, from page server instance(s) 122A-122N, respectively, set(s) of aggregate page statistics 144A-144B comprising ordered listings of pages served by page server instance(s) 122A-122N, respectively.

In step 608, an ordered list of page identifiers is determined based on the first set of aggregate page statistics and the second set of aggregate page statistics, the ordered list comprising identifiers of hot pages frequently accessed by the set of compute replicas. For example, hot list aggregator(s) 220A-220B aggregate set(s) of aggregate page statistics 144A-144B based on estimated page access frequencies of pages determined by page server instance(s) 122A-122N to generate aggregate timestamped access counts 320A-320B.

In step 610, a cache of the first compute replica is iteratively populated until the satisfaction of a predetermined termination condition. For example, cache populator(s) 222A-222B iterate through pages in aggregate hot list(s) 238A-238B based on the estimated page access frequencies associated with the pages to determine whether a page in aggregate hot list(s) 238A-238B is cached in cache(s) 114A-114B, respectively. In embodiments, cache populator(s) 222A-222B populate cache(s) 114A-114B in such a manner until a predetermined termination condition is satisfied, such as, but not limited to, a utilization of cache(s) 114A-114B satisfying a predetermined percentage of a cache size of cache(s) 114A-114B, caching a missing page missing from cache(s) 114A-114B causes eviction of another page from cache(s) 114A-114B, and/or pages identified in aggregate hot list(s) 238A-238B are cached in cache(s) 114A-114B. In embodiments, iterations of step 610 comprise the performance of steps 612 and/or 614.

In step 612, it is determined whether a particular hot page identified in the ordered list of page identifiers is missing from the cache of the first compute replica. For example, cache populator(s) 222A-222B determine that a page in aggregate hot list(s) 238A-238B is missing from cache(s) 114A-114B. Upon determining that a particular page in aggregate hot list(s) 238A-238B is missing from cache(s) 114A-114B, flowchart 600 proceeds to step 614. Upon determining that a particular page in aggregate hot list(s) 238A-238B is present in cache(s) 114A-114B, flowchart 600 proceeds to the next iteration by returning to step 612 and determining whether a next page in aggregate hot list(s) 238A-238B is missing from cache(s) 114A-114B.

In step 614, responsive to determining that the particular hot page is missing from the cache of the first compute replica, obtaining the particular hot page for caching at the first compute replica. For example, cache populator(s) 222A-222B, upon determining that a page in aggregate hot list(s) 238A-238B is missing from cache(s) 114A-114B, obtain missing page(s) 148A-148B from respective page server instance(s) 122A-122N that serve missing page(s) 148A-148B, and cache missing page(s) 148A-148B in cache(s) 114A-114B, respectively. Upon caching missing page(s) 148A-148B in cache(s) 114A-114B, respectively, flowchart 600 returns to step 612 and determining whether a next page in aggregate hot list(s) 238A-238B is missing from cache(s) 114A-114B.

Figure 7:
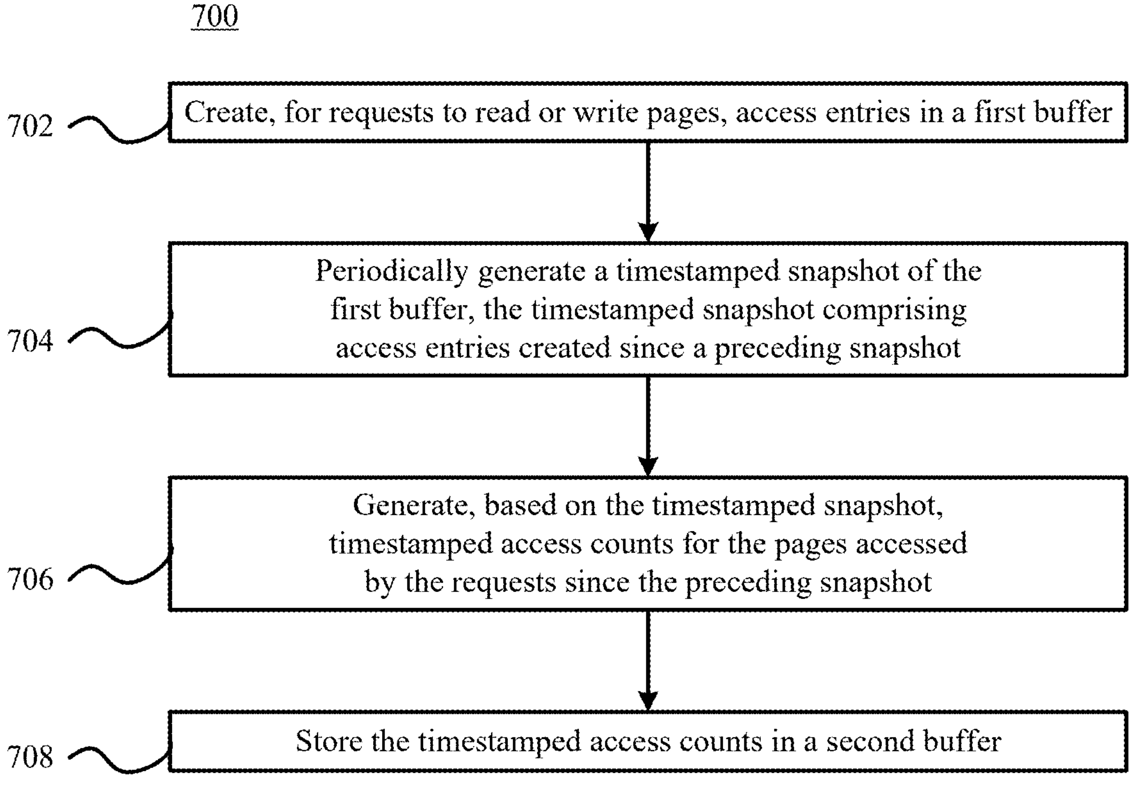
FIG. 7 depicts a flowchart of a process for generating timestamped page statistics at a compute replica, in accordance with an embodiment.

Embodiments described herein may operate in various ways to generate timestamped page statistics at a compute replica. For instance, FIG. 7 depicts a flowchart of a process for generating timestamped page statistics at a compute replica, in accordance with an embodiment. Compute replica set 110, primary compute replica(s) 112A-112B, data access tracker(s) 118A-118B, data access event handler(s) 210A-210B, buffer(s) 212A-212B, access data processor(s) 214A-

214B, storage(s) 216A-216B, and/or data separator(s) 218A-218B may, for example, operate according to flowchart 700. Note that not all steps of flowchart 700 may need to be performed in all embodiments, and in some embodiments, the steps of flowchart 700 may be performed in different orders than shown. Flowchart 700 is described as follows with respect to FIGS. 1-4 for illustrative purposes.

Flowchart 700 starts at step 702. In step 702, access entries are created in a first buffer for requests to read or write pages. For instance, data access event handler(s) 210A-210B detect requests to read or write pages handled by compute replica(s) 112A-B, and generate, for pages accessed by the requests, one or more access entries 230A-230B indicating the page accessed. In embodiments, data access event handler(s) 210A-210B store the access entries 230A-230B in buffer(s) 212A-212B, respectively.

In step 704, a timestamped snapshot of the first buffer is periodically generated, the timestamped snapshot comprising access entries created since a preceding snapshot. For example, access data processor(s) 214A-214B generate timestamped snapshot(s) 232A-232B that respectively comprise access entries 230A-230B stored respectively in buffer(s) 212A-212B, and a timestamp associated with the timestamped snapshot(s) 232A-232B (e.g., time when timestamped snapshot(s) 232A-232B were taken).

In step 706, timestamped access counts are generated for pages accessed by the requests since the preceding snapshot. For example, access data processor(s) 214A-214B generate, based on timestamped snapshot(s) 232A-232B, corresponding timestamped access count(s) 234A-234B that comprise the timestamp of timestamped snapshot(s) 232A-232B, the pages accessed during a period captured by timestamped snapshot(s) 232A-232B, and a count of a number of times the pages were accessed during the period captured by timestamped snapshot(s) 232A-232B.

In step 708, the timestamped access counts are stored in a second buffer. For example, access data processor(s) 214A-214B store timestamped access count(s) 234A-234B in storage(s) 216A-216B, respectively, for future transmission to page servers serving the accessed pages.

Figure 8:
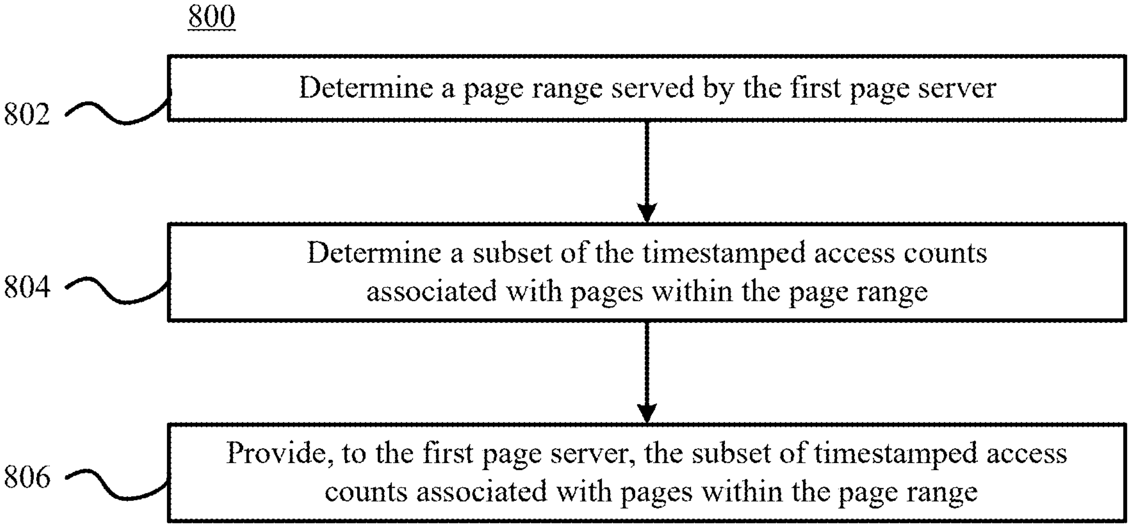
FIG. 8 depicts a flowchart of a process for providing timestamped page statistics to a page server, in accordance with an embodiment.

Embodiments described herein may operate in various ways to provide timestamped page statistics to a page server. For instance, FIG. 8 depicts a flowchart of a process for providing timestamped page statistics to a page server, in accordance with an embodiment. Compute replica set 110, primary compute replica(s) 112A-112B, data access tracker(s) 118A-118B, data access event handler(s) 210A-210B, buffer(s) 212A-212B, access data processor(s) 214A-214B, storage(s) 216A-216B, and/or data separator(s) 218A-218B may, for example, operate according to flowchart 800. Note that not all steps of flowchart 800 may need to be performed in all embodiments, and in some embodiments, the steps of flowchart 800 may be performed in different orders than shown. Flowchart 800 is described as follows with respect to FIGS. 1-4 for illustrative purposes.

Flowchart 800 starts at step 802. In step 802, a page range served by a first page server is determined. For example, data separator(s) 218A-218B determine the page ranges served by page server instance(s) 122A-122N.

In step 804, a subset of timestamped access counts associated with pages within the page range are determined. For example, data separator(s) 218A-218B determine one or more subsets of timestamped access count(s) 234A-234B served by page server instance(s) 122A-122N according to the determined page ranges.

In step 806, the subset of timestamped access counts associated with pages within the page range are provided to the first page server. For example, data separator(s) 218A-218B provide the subset(s) of timestamped access count(s) 234A-234B as page statistics 140A-140B to page server instance(s) 122A-122N according to the page ranges. In embodiments, data separator(s) 218A-218B provide separated timestamped access count(s) 234A-234B to page server instance(s) 122A-122N on a periodic basis and/or when it is determined that the storage(s) 216A-216B satisfy a utilization threshold (e.g., based on a resource utilization, an elapsed time period, access entry creation rate, etc.).

Figure 9:
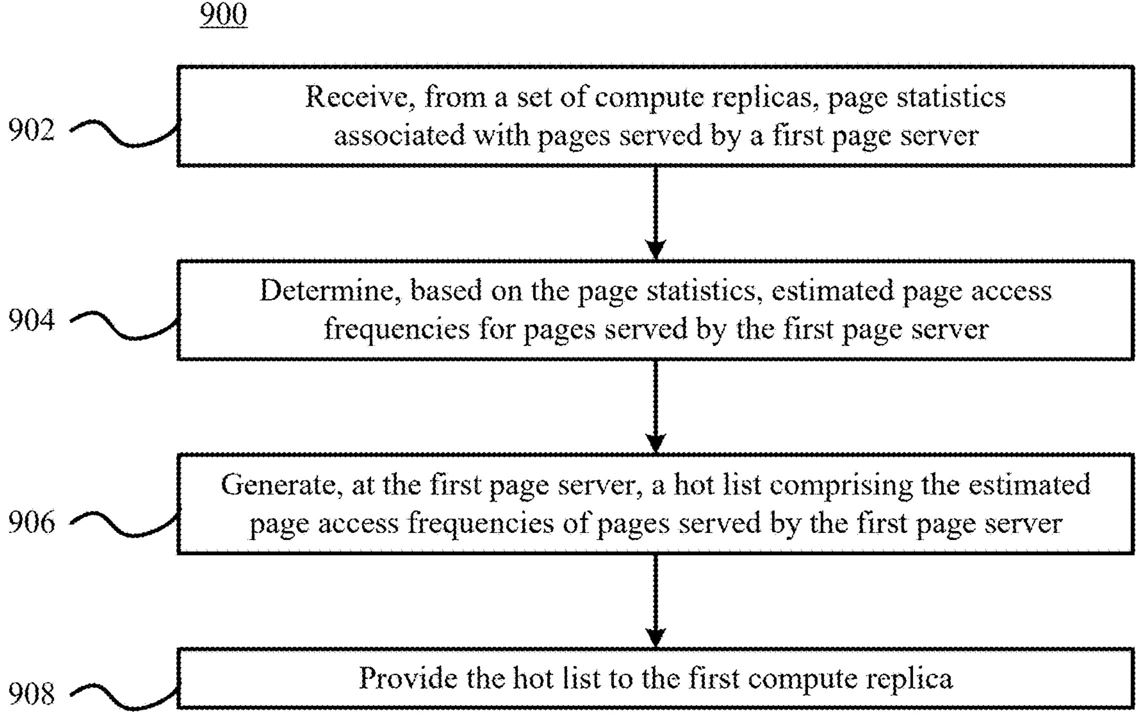
FIG. 9 depicts a flowchart of a process for generating aggregate page statistics at a page server, in accordance with an embodiment.

Embodiments described herein may operate in various ways to generate aggregate page statistics at a page server. For instance, FIG. 9 depicts a flowchart of a process for generating aggregate page statistics at a page server, in accordance with an embodiment. Page server set 120, page server instance(s) 122A-122N, list manager(s) 124A-124N, hot list(s) 126A-126N, page server cache(s) 128A-128N, page server cache manager(s) 130A-130N, page statistics aggregator(s) 310A-310N, page access frequency estimator(s) 312A-312N, and/or hot list updater(s) 314A-314N may, for example, operate according to flowchart 900. Note that not all steps of flowchart 900 may need to be performed in all embodiments, and in some embodiments, the steps of flowchart 900 may be performed in different orders than shown. Flowchart 900 is described as follows with respect to FIGS. 1-4 for illustrative purposes.

Flowchart 900 starts at step 902. In step 902, page statistics associated with pages served by a first page server are received from a set of compute replicas. For example, page statistics aggregator(s) 310A-310N receive, from compute replica(s) 112A-112B of compute replica set 110, timestamped access count(s) associated with pages served by page server instance(s) 122A-122N, respectively. In embodiments, page statistics aggregator(s) 310A-310N aggregate timestamped access count(s) received from compute replica(s) 112A-112B of compute replica set 110 by combining (e.g., adding, adding weighted based on timestamp, etc.) timestamped access count(s) associated with the same page identifier and/or the same timestamp.

In step 904, estimated page access frequencies are determined for pages served by the first page server based on the page statistics. For example, page access frequency estimator(s) 312A-312N calculate and/or recalculate estimated page access frequencies 322A-322N by applying an exponential smoothing function on aggregate timestamped access count(s) 320A-320N. For instance, page access frequency estimator(s) 312A-312N calculate estimated page access frequencies 322A-322N for pages in hot list(s) 126A-126N by applying, to pages served by page server instance(s) 122A-122N, a decay factor, a, that determines the weight given to new aggregate timestamped access count(s) 320A-320N and how quickly to decay older aggregate timestamped access count(s) 320A-320N. In embodiments, $\alpha$ is set in the range of 0.01 to 0.05, where higher values give more weight to new timestamped access counts. In embodiments, page access frequency estimator(s) 312A-312N calculate updated estimated page access frequencies 322A-322N for the pages based on previously estimated page access frequencies 322A-322N and new aggregate timestamped access count(s) 320A-320N.

In step 906, a hot list is generated at the first page server, the hot list comprising estimated page access frequencies of pages served by the first page server. For example, hot list updater(s) 314A-314N analyze the updated estimated page access frequencies 322A-322N received from page access frequency estimator(s) 312A-312N to determine pages to include in hot list(s) 126A-126N. For instance, hot list updater(s) 314A-314N determine, based on the updated estimated page access frequencies 322A-322N, a predetermined number of pages with the highest estimated page access frequencies 322A-322N, and/or pages with estimated page access frequencies 322A-322N that satisfy a cutoff condition (e.g., estimated page access frequency threshold).

In step 908, the hot list is provided to the compute replica. For example, hot list updater(s) 314A-314N provide updated hot list(s) 126A-126N to compute replica(s) 112A-112B of compute replica set 110 after updating hot list(s) 126A-126N and/or on a periodic basis.

Figure 10:
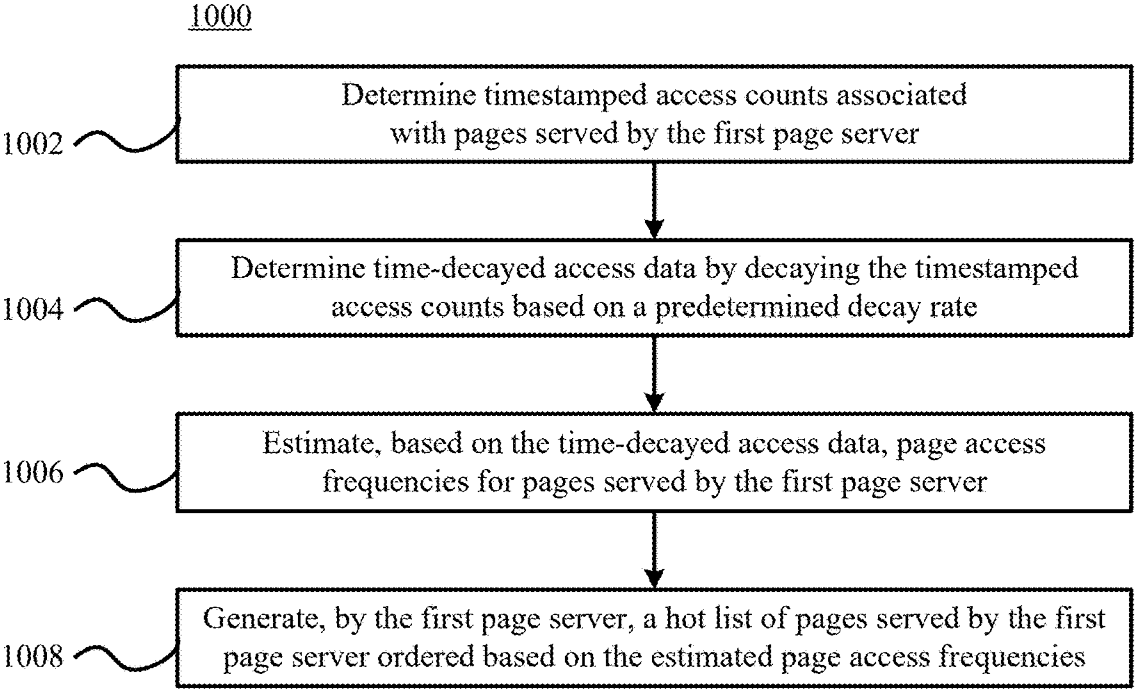
FIG. 10 depicts a flowchart of a process for estimating page access frequencies based on timestamped page statistics, in accordance with an embodiment.

Embodiments described herein may operate in various ways to estimate page access frequencies based on timestamped page statistics. For instance, FIG. 10 depicts a flowchart of a process for estimating page access frequencies based on timestamped page statistics, in accordance with an embodiment. Page server set 120, page server instance(s) 122A-122N, list manager(s) 124A-124N, hot list(s) 126A-126N, page server cache(s) 128A-128N, page server cache manager(s) 130A-130N, page statistics aggregator(s) 310A-310N, page access frequency estimator(s) 312A-312N, and/or hot list updater(s) 314A-314N may, for example, operate according to flowchart 1000. Note that not all steps of flowchart 1000 may need to be performed in all embodiments, and in some embodiments, the steps of flowchart 1000 may be performed in different orders than shown. Flowchart 1000 is described as follows with respect to FIGS. 1-4 for illustrative purposes.

Flowchart 1000 starts at step 1002. In step 1002, timestamped access counts associated with pages served by a first page server are determined. For example, page statistics aggregator(s) 310A-310N receive, from compute replica(s) 112A-112B of compute replica set 110, timestamped access count(s) associated with pages served by page server instance(s) 122A-122N.

In step 1004, time-decayed access data is determined by decaying the timestamped access counts based on a predetermined decay rate. For example, page access frequency estimator(s) 312A-312N apply, to pages served by page server instance(s) 122A-122N, a decay factor, a, that determines the weight given to new aggregate timestamped access count(s) 320A-320N and how quickly to decay older aggregate timestamped access count(s) 320A-320N. In embodiments, $\alpha$ is set in the range of 0.01 to 0.05, where higher values give more weight to new timestamped access counts.

In step 1006, page access frequencies are estimated for pages served by the first page server based on the time-decayed access data. For example, page access frequency estimator(s) 312A-312N calculate and/or recalculate estimated page access frequencies 322A-322N by applying an exponential smoothing function that aggregates time-decayed aggregate timestamped access count(s) 320A-320N.

In step 1008, a hot list of pages served by the first page server is generated, the hot list ordered based on the estimated page access frequencies. For example, hot list updater(s) 314A-314N analyze the updated estimated page access frequencies 322A-322N received from page access frequency estimator(s) 312A-312N to determine pages to include in hot list(s) 126A-126N. For instance, hot list updater(s) 314A-314N determine, based on the updated estimated page access frequencies 322A-322N, a predetermined number of pages with the highest estimated page access frequencies 322A-322N, and/or pages with estimated page access frequencies 322A-322N that satisfy a cutoff condition (e.g., estimated page access frequency threshold).

III. Example Mobile Device and Computer System Implementation

Server infrastructure 102, compute replica set 110, primary compute replica 112A, secondary compute replica(s) 112B, cache(s) 114A-114B, cache manager(s) 116A-116B, data access tracker(s) 118A-118B, page server set 120, page server instance(s) 122A-122N, list manager 124N, hot list 126N, page server cache 128N, page server cache manager 130N, storage 132, data file(s) 134A-134N, data access event handler(s) 210A-210B, buffer(s) 212A-212B, access data processor(s) 214A-214B, storage(s) 216A-216B, data separator(s) 218A-218B, hot list aggregator(s) 220A-220B, cache populator(s) 222A-222B, page statistics aggregator(s) 310A-310N, page access frequency estimator(s) 312A-312N, hot list updater(s) 314A-314N, cache manager 410, request handler 412, buffer manager 414, buffer pool 422, buffer pool extension 424, buffer pool extension storage 426, buffer pool extension page file 428, and/or the components described therein, and/or the steps of flowcharts 500, 600, 700, 800, 900, and/or 1000 are implemented in hardware, or hardware combined with one or both of software and/or firmware. For example, server infrastructure 102, compute replica set 110, primary compute replica 112A, secondary compute replica(s) 112B, cache(s) 114A-114B, cache manager(s) 116A-116B, data access tracker(s) 118A-118B, page server set 120, page server instance(s) 122A-122N, list manager 124N, hot list 126N, page server cache 128N, page server cache manager 130N, storage 132, data file(s) 134A-134N, data access event handler(s) 210A-210B, buffers 212A-212B, access data processor(s) 214A-214B, storage(s) 216A-216B, data separator(s) 218A-218B, hot list aggregator(s) 220A-220B, cache populator(s) 222A-222B, page statistics aggregator(s) 310A-310N, page access frequency estimator(s) 312A-312N, hot list updater(s) 314A-314N, cache manager 410, request handler 412, buffer manager 414, buffer pool 422, buffer pool extension 424, buffer pool extension storage 426, buffer pool extension page file 428, and/or the components described therein, and/or the steps of flowcharts 500, 600, 700, 800, 900, and/or 1000 are each implemented as computer program code/instructions configured to be executed in one or more processors and stored in a computer readable storage medium. Alternatively, server infrastructure 102, compute replica set 110, primary compute replica 112A, secondary compute replica(s) 112B, cache(s) 114A-114B, cache manager(s) 116A-116B, data access tracker(s) 118A-118B, page server set 120, page server instance(s) 122A-122N, list manager 124N, hot list 126N, page server cache 128N, page server cache manager 130N, storage 132, data file(s) 134A-134N, data access event handler(s) 210A-210B, buffer(s) 212A-212B, access data processor(s) 214A-214B, storage(s) 216A-216B, data separator(s) 218A-218B, hot list aggregator(s) 220A-220B, cache populator(s) 222A-222B, page statistics aggregator(s) 310A-310N, page access frequency estimator(s) 312A-312N, hot list updater(s) 314A-314N, cache manager 410, request handler 412, buffer manager 414, buffer pool 422, buffer pool extension 424, buffer pool extension storage 426, buffer pool extension page file 428, and/or the components described therein, and/or the steps of flowcharts 500, 600, 700, 800, 900, and/or 1000 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 11:
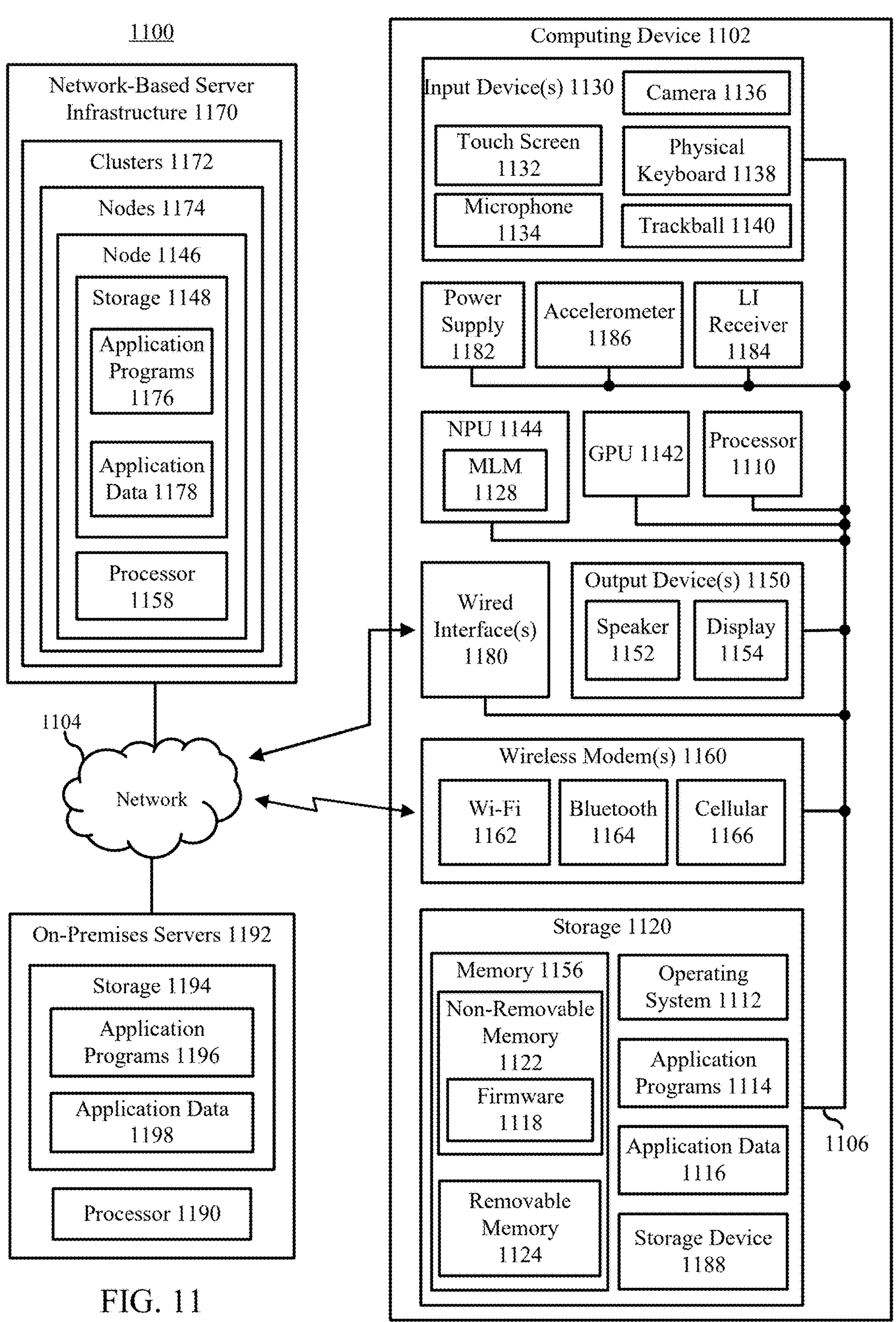
FIG. 11 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 11. FIG. 11 shows a block diagram of an exemplary computing environment 1100 that includes a computing device 1102. Computing device 1102 is an example of server infrastructure 102, compute replica set 110, primary compute replica 112A, secondary compute replica(s) 112B, page server set 120, page server instance(s) 122A-122N, which each include one or more of the components of computing device 1102. In some embodiments, computing device 1102 is communicatively coupled with devices (not shown in FIG. 11) external to computing environment 1100 via network 1104. Network 1104 comprises one or more networks such as local area networks (LANs), wide area networks (WANs), enterprise networks, the Internet, etc. In examples, network 1104 includes one or more wired and/or wireless portions. In some examples, network 1104 additionally or alternatively includes a cellular network for cellular communications. Computing device 1102 is described in detail as follows.

Computing device 1102 can be any of a variety of types of computing devices. Examples of computing device 1102 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 1102 is a stationary computing device such as a desktop computer, a personal computer (PC), a stationary server device, a minicomputer, a mainframe, a supercomputer, etc.

As shown in FIG. 11, computing device 1102 includes a variety of hardware and software components, including a processor 1110, a storage 1120, a graphics processing unit (GPU) 1142, a neural processing unit (NPU) 1144, one or more input devices 1130, one or more output devices 1150, one or more wireless modems 1160, one or more wired interfaces 1180, a power supply 1182, a location information (LI) receiver 1184, and an accelerometer 1186. Storage 1120 includes memory 1156, which includes non-removable memory 1122 and removable memory 1124, and a storage device 1188. Storage 1120 also stores an operating system 1112, application programs 1114, and application data 1116. Wireless modem(s) 1160 include a Wi-Fi modem 1162, a Bluetooth modem 1164, and a cellular modem 1166. Output device(s) 1150 includes a speaker 1152 and a display 1154. Input device(s) 1130 includes a touch screen 1132, a microphone 1134, a camera 1136, a physical keyboard 1138, and a trackball 1140. Not all components of computing device 1102 shown in FIG. 11 are present in all embodiments, additional components not shown may be present, and in a particular embodiment any combination of the components are present. In examples, components of computing device 1102 are mounted to a circuit card (e.g., a motherboard) of computing device 1102, integrated in a housing of computing device 1102, or otherwise included in computing device 1102. The components of computing device 1102 are described as follows.

In embodiments, a single processor 1110 (e.g., central processing unit (CPU), microcontroller, a microprocessor, signal processor, ASIC (application specific integrated circuit), and/or other physical hardware processor circuit) or multiple processors 1110 are present in computing device 1102 for performing such tasks as program execution, signal coding, data processing, input/output processing, power control, and/or other functions. In examples, processor 1110 is a single-core or multi-core processor, and each processor core is single-threaded or multithreaded (to provide multiple threads of execution concurrently). Processor 1110 is configured to execute program code stored in a computer readable medium, such as program code of operating system 1112 and application programs 1114 stored in storage 1120. The program code is structured to cause processor 1110 to perform operations, including the processes/methods disclosed herein. Operating system 1112 controls the allocation and usage of the components of computing device 1102 and provides support for one or more application programs 1114 (also referred to as "applications" or "apps"). In examples, application programs 1114 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 1110 includes one or more general processors (e.g., CPUs) configured with or coupled to one or more hardware accelerators, such as one or more NPUs 1144 and/or one or more GPUs 1142.

Any component in computing device 1102 can communicate with any other component according to function, although not all connections are shown for ease of illustration. For instance, as shown in FIG. 11, bus 1106 is a multiple signal line communication medium (e.g., conductive traces in silicon, metal traces along a motherboard, wires, etc.) present to communicatively couple processor 1110 to various other components of computing device 1102, although in other embodiments, an alternative bus, further buses, and/or one or more individual signal lines is/are present to communicatively couple components. Bus 1106 represents one or more of any of several types of bus structures, including a memory bus or memory controller, a peripheral bus, an accelerated graphics port, and a processor or local bus using any of a variety of bus architectures.

Storage 1120 is physical storage that includes one or both of memory 1156 and storage device 1188, which store operating system 1112, application programs 1114, and application data 1116 according to any distribution. Non-removable memory 1122 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 1122 includes main memory and is separate from or fabricated in a same integrated circuit as processor 1110. As shown in FIG. 11, non-removable memory 1122 stores firmware 1118 that is present to provide low-level control of hardware. Examples of firmware 1118 include BIOS (Basic Input/Output System, such as on personal computers) and boot firmware (e.g., on smart phones). In examples, removable memory 1124 is inserted into a receptacle of or is otherwise coupled to computing device 1102 and can be removed by a user from computing device 1102. Removable memory 1124 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 1188 are present that are internal and/or external to a housing of computing device 1102 and are or are not removable. Examples of storage device 1188 include a hard disk drive, a SSD, a thumb drive (e.g., a USB (Universal Serial Bus) flash drive), or other physical storage device.

One or more programs are stored in storage 1120. Such programs include operating system 1112, one or more application programs 1114, and other program modules and program data. Examples of such application programs include computer program logic (e.g., computer program code/instructions) for implementing server infrastructure 102, compute replica set 110, primary compute replica 112A, secondary compute replica(s) 112B, cache(s) 114A-114B, cache manager(s) 116A-116B, data access tracker(s) 118A-118B, page server set 120, page server instance(s) 122A-122N, list manager 124N, hot list 126N, page server cache 128N, page server cache manager 130N, storage 132, data file(s) 134A-134N, data access event handler(s) 210A-210B, buffer(s) 212A-212B, access data processor(s) 214A-214B, storage(s) 216A-216B, data separator(s) 218A-218B, hot list aggregator(s) 220A-220B, cache populator(s) 222A-222B, page statistics aggregator(s) 310A-310N, page access frequency estimator(s) 312A-312N, hot list updater(s) 314A-314N, cache manager 410, request handler 412, buffer manager 414, buffer pool 422, buffer pool extension 424, buffer pool extension storage 426, buffer pool extension page file 428, and/or the components described therein, and/or the steps of flowcharts 500, 600, 700, 800, 900, 1000, and/or any individual steps thereof.

Storage 1120 also stores data used and/or generated by operating system 1112 and application programs 1114 as application data 1116. Examples of application data 1116 include web pages, text, images, tables, sound files, video data, and other data. In examples, application data 1116 is sent to and/or received from one or more network servers or other devices via one or more wired or wireless networks. Storage 1120 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 1102 through one or more input devices 1130 and receives information from computing device 1102 through one or more output devices 1150. Input device(s) 1130 includes one or more of touch screen 1132, microphone 1134, camera 1136, physical keyboard 1138 and/or trackball 1140 and output device(s) 1150 includes one or more of speaker 1152 and display 1154. Each of input device(s) 1130 and output device(s) 1150 are integral to computing device 1102 (e.g., built into a housing of computing device 1102) or are external to computing device 1102 (e.g., communicatively coupled wired or wirelessly to computing device 1102 via wired interface(s) 1180 and/or wireless modem(s) 1160). Further input devices 1130 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1154 displays information, as well as operating as touch screen 1132 by receiving user commands and/or other information (e.g., by touch, finger gestures, virtual keyboard, etc.) as a user interface. Any number of each type of input device(s) 1130 and output device(s) 1150 are present, including multiple microphones 1134, multiple cameras 1136, multiple speakers 1152, and/or multiple displays 1154.

In embodiments where GPU 1142 is present, GPU 1142 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 1142 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 1144 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 1128. In an example, NPU 1144 is configured for a data-driven parallel computing and is highly efficient at processing massive multimedia data such as videos and images and processing data for neural networks. NPU 1144 is configured for efficient handling of AI-related tasks, such as speech recognition, background blurring in video calls, photo or video editing processes like object detection, etc.

In embodiments disclosed herein that implement ML models, NPU 1144 can be utilized to execute such ML models, of which MLM 1128 is an example. For instance, where applicable, MLM 1128 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 1144 is used to train MLM 1128. To train MLM 1128, training data is that includes input features (attributes) and their corresponding output labels/target values (e.g., for supervised learning) is collected. A training algorithm is a computational procedure that is used so that MLM 1128 learns from the training data. Parameters/weights are internal settings of MLM 1128 that are adjusted during training by the training algorithm to reduce a difference between predictions by MLM 1128 and actual outcomes (e.g., output labels). In some examples, MLM 1128 is set with initial values for the parameters/weights. A loss function measures a dissimilarity between predictions by MLM 1128 and the target values, and the parameters/weights of MLM 1128 are adjusted to minimize the loss function. The parameters/weights are iteratively adjusted by an optimization technique, such as gradient descent. In this manner, MLM 1128 is generated through training by NPU 1144 to be used to generate inferences based on received input feature sets for particular applications. MLM 1128 is generated as a computer program or other type of algorithm configured to generate an output (e.g., a classification, a prediction/inference) based on received input features, and is stored in the form of a file or other data structure.

In examples, such training of MLM 1128 by NPU 1144 is supervised or unsupervised. According to supervised learning, input objects (e.g., a vector of predictor variables) and a desired output value (e.g., a human-labeled supervisory signal) train MLM 1128. The training data is processed, building a function that maps new data on expected output values. Example algorithms usable by NPU 1144 to perform supervised training of MLM 1128 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 1128 is an LLM, MLM 1128 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 1128 is trained to learn patterns from unlabeled data. For instance, in embodiments where MLM 1128 implements unsupervised learning techniques, MLM 1128 identifies one or more classifications or clusters to which an input belongs. During a training phase of MLM 1128 according to unsupervised learning, MLM 1128 tries to mimic the provided training data and uses the error in its mimicked output to correct itself (i.e., correct weights and biases). In further examples, NPU 1144 perform unsupervised training of MLM 1128 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 1144 need not necessarily be present in all ML model embodiments. In embodiments where ML models are present, any one or more of processor 1110, GPU 1142, and/or NPU 1144 can be present to train and/or execute MLM 1128.

One or more wireless modems 1160 can be coupled to antenna(s) (not shown) of computing device 1102 and can support two-way communications between processor 1110 and devices external to computing device 1102 through network 1104, as would be understood to persons skilled in the relevant art(s). Wireless modem 1160 is shown generically and can include a cellular modem 1166 for communicating with one or more cellular networks, such as a GSM network for data and voice communications within a single cellular network, between cellular networks, or between the mobile device and a public switched telephone network (PSTN). In examples, wireless modem 1160 also or alternatively includes other radio-based modem types, such as a Bluetooth modem 1164 (also referred to as a "Bluetooth device") and/or Wi-Fi modem 1162 (also referred to as an "wireless adaptor"). Wi-Fi modem 1162 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1164 is configured to communicate with another Bluetooth-capable device according to the Bluetooth short-range wireless technology standard(s) such as IEEE 802.15.1 and/or managed by the Bluetooth Special Interest Group (SIG).

Computing device 1102 can further include power supply 1182, LI receiver 1184, accelerometer 1186, and/or one or more wired interfaces 1180. Example wired interfaces 1180 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 1180 of computing device 1102 provide for wired connections between computing device 1102 and network 1104, or between computing device 1102 and one or more devices/peripherals when such devices/peripherals are external to computing device 1102 (e.g., a pointing device, display 1154, speaker 1152, camera 1136, physical keyboard 1138, etc.). Power supply 1182 is configured to supply power to each of the components of computing device 1102 and receives power from a battery internal to computing device 1102, and/or from a power cord plugged into a power port of computing device 1102 (e.g., a USB port, an A/C power port). LI receiver 1184 is useable for location determination of computing device 1102 and in examples includes a satellite navigation receiver such as a Global Positioning System (GPS) receiver and/or includes other type of location determiner configured to determine location of computing device 1102 based on received information (e.g., using cell tower triangulation, etc.). Accelerometer 1186, when present, is configured to determine an orientation of computing device 1102.

Note that the illustrated components of computing device 1102 are not required or all-inclusive, and fewer or greater numbers of components can be present as would be recognized by one skilled in the art. In examples, computing device 1102 includes one or more of a gyroscope, barometer, proximity sensor, ambient light sensor, digital compass, etc. In an example, processor 1110 and memory 1156 are co-located in a same semiconductor device package, such as being included together in an integrated circuit chip, FPGA, or system-on-chip (SOC), optionally along with further components of computing device 1102.

In embodiments, computing device 1102 is configured to implement any of the above-described features of flowcharts herein. Computer program logic for performing any of the operations, steps, and/or functions described herein is stored in storage 1120 and executed by processor 1110.

In some embodiments, server infrastructure 1170 is present in computing environment 1100 and is communicatively coupled with computing device 1102 via network 1104. Server infrastructure 1170, when present, is a network-accessible server set (e.g., a cloud-based environment or platform). As shown in FIG. 11, server infrastructure 1170 includes clusters 1172. Each of clusters 1172 comprises a group of one or more compute nodes and/or a group of one or more storage nodes. For example, as shown in FIG. 11, cluster 1172 includes nodes 1174. Each of nodes 1174 are accessible via network 1104 (e.g., in a "cloud-based" embodiment) to build, deploy, and manage applications and services. In examples, any of nodes 1174 is a storage node that comprises a plurality of physical storage disks, SSDs, and/or other physical storage devices that are accessible via network 1104 and are configured to store data associated with the applications and services managed by nodes 1174.

Each of nodes 1174, as a compute node, comprises one or more server computers, server systems, and/or computing devices. For instance, a node 1174 in accordance with an embodiment includes one or more of the components of computing device 1102 disclosed herein. Each of nodes 1174 is configured to execute one or more software applications (or "applications") and/or services and/or manage hardware resources (e.g., processors, memory, etc.), which are utilized by users (e.g., customers) of the network-accessible server set. In examples, as shown in FIG. 11, nodes 1174 includes a node 1146 that includes storage 1148 and/or one or more of a processor 1158 (e.g., similar to processor 1110, GPU 1142, and/or NPU 1144 of computing device 1102). Storage 1148 stores application programs 1176 and application data 1178. Processor(s) 1158 operate application programs 1176 which access and/or generate related application data 1178. In an implementation, nodes such as node 1146 of nodes 1174 operate or comprise one or more virtual machines, with each virtual machine emulating a system architecture (e.g., an operating system), in an isolated manner, upon which applications such as application programs 1176 are executed.

In embodiments, one or more of clusters 1172 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 1172 are included in a datacenter in a distributed collection of datacenters. In embodiments, exemplary computing environment 1100 comprises part of a cloud-based platform.

In an embodiment, computing device 1102 accesses application programs 1176 for execution in any manner, such as by a client application and/or a browser at computing device 1102.

In an example, for purposes of network (e.g., cloud) backup and data security, computing device 1102 additionally and/or alternatively synchronizes copies of application programs 1114 and/or application data 1116 to be stored at network-based server infrastructure 1170 as application programs 1176 and/or application data 1178. In examples, operating system 1112 and/or application programs 1114 include a file hosting service client configured to synchronize applications and/or data stored in storage 1120 at network-based server infrastructure 1170.

In some embodiments, on-premises servers 1192 are present in computing environment 1100 and are communicatively coupled with computing device 1102 via network 1104. On-premises servers 1192, when present, are hosted within an organization's infrastructure and, in many cases, physically onsite of a facility of that organization. On-premises servers 1192 are controlled, administered, and maintained by IT (Information Technology) personnel of the organization or an IT partner to the organization. Application data 1198 can be shared by on-premises servers 1192 between computing devices of the organization, including computing device 1102 (when part of an organization) through a local network of the organization, and/or through further networks accessible to the organization (including the Internet). Furthermore, in examples, on-premises servers 1192 serve applications such as application programs 1196 to the computing devices of the organization, including computing device 1102. Accordingly, in examples, on-premises servers 1192 include storage 1194 (which includes one or more physical storage devices such as storage disks and/or SSDs) for storage of application programs 1196 and application data 1198 and include a processor 1190 (e.g., similar to processor 1110, GPU 1142, and/or NPU 1144 of computing device 1102) for execution of application programs 1196. In some embodiments, multiple processors 1190 are present for execution of application programs 1196 and/or for other purposes. In further examples, computing device 1102 is configured to synchronize copies of application programs 1114 and/or application data 1116 for backup storage at on-premises servers 1192 as application programs 1196 and/or application data 1198.

Embodiments described herein may be implemented in one or more of computing device 1102, network-based server infrastructure 1170, and on-premises servers 1192. For example, in some embodiments, computing device 1102 is used to implement systems, clients, or devices, or components/subcomponents thereof, disclosed elsewhere herein. In other embodiments, a combination of computing device 1102, network-based server infrastructure 1170, and/or on-premises servers 1192 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1120. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per sc. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1114) are stored in storage 1120. Such computer programs can also be received via wired interface(s) 1160 and/or wireless modem(s) 1160 over network 1104. Such computer programs, when executed or loaded by an application, enable computing device 1102 to implement features of embodiments discussed herein. Accordingly, such computer programs represent controllers of the computing device 1102.

Embodiments are also directed to computer program products comprising computer code or instructions stored on any computer-readable medium or computer-readable storage medium. Such computer program products include the physical storage of storage 1120 as well as further physical storage types.

IV. Additional Example Embodiments

In embodiments, a method comprises: maintaining, at a first compute replica of a set of compute replicas, page statistics associated with requests to read or write pages, the requests handled by the first compute replica; providing, to a first page server that serves a first page, a first subset of the page statistics comprising page statistics associated with the first page and an identifier of the first page; receiving, from the first page server, a first set of aggregate page statistics comprising, for a second page served by the first page server, an identifier of the second page and an aggregate page access frequency of the second page by the set of compute replicas; determining that the second page is missing from a cache of the first compute replica; and obtaining, from the first page server, the second page for caching at the first compute replica.

In embodiments, maintaining, at a first compute replica of a set of compute replicas, page statistics comprises: creating, for requests to read or write pages, access entries in a first buffer; periodically generating a timestamped snapshot of the first buffer, the periodic timestamped snapshots comprising access entries created since a preceding snapshot; generating, based on the timestamped snapshot, timestamped access counts for the pages accessed by the requests since the preceding snapshot; and storing the timestamped access counts in a second buffer.

In embodiments, providing, to a first page server that serves a first page, a first subset of the page statistics comprises: determining a page range served by the first page server; determining a subset of the timestamped access counts associated with pages within the page range; and providing, to the first page server, the subset of timestamped access counts associated with pages within the page range.

In embodiments, the first set of aggregate page statistics comprises estimated page access frequencies determined based at least on the subset of timestamped access counts and a predetermined decay rate.

In embodiments, providing, to a first page server that serves the first page, a first subset of the page statistics is performed responsive to at least one of: determining that a utilization of the second buffer satisfies a predetermined utilization threshold; or determining that a time elapsed since a previous providing of page statistics to the first page server satisfies a predetermined periodicity condition.

In embodiments, the method further comprises: providing, to a second page server, a second subset of the page statistics comprising page statistics associated with pages served by the second page server; receiving, from the second page server, a second set of aggregate page statistics comprising, for a third page served by the second page server, an identifier of the third page and an aggregate page access frequency of the third page by the set of compute replicas; determining, based on the first set of aggregate page statistics and the second set of aggregate page statistics, an ordered list of page identifiers comprising identifiers of hot pages frequently accessed by the set of compute replicas; and iteratively populating the cache of the first compute replica until satisfaction of a predetermined termination condition by: determining whether a particular hot page identified in the ordered list of page identifiers is missing from the cache of the first compute replica, and responsive to determining that the particular hot page is missing from the cache of the first compute replica, obtaining the particular hot page for caching at the first compute replica.

In embodiments, satisfaction of a termination condition comprises at least one of: utilization of the cache of the first compute replica satisfies a predetermined percentage of a cache size of the cache of the first compute replica; caching the particular hot page missing from the cache of the first compute replica causes eviction of another page from the cache of the first compute replica; or pages identified in the ordered list of page identifiers are cached at the first compute replica.

In embodiments, a system comprises: a processor; and a memory device comprising program code structured to cause the processor to: maintain, at a first compute replica of a set of compute replicas, page statistics associated with requests to read or write pages, the requests handled by the first compute replica; provide, to a first page server that serves a first page, a first subset of the page statistics comprising page statistics associated with the first page and an identifier of the first page; receive, from the first page server, a first set of aggregate page statistics comprising, for a second page served by the first page server, an identifier of the second page and an aggregate page access frequency of the second page by the set of compute replicas; determine that the second page is missing from a cache of the first compute replica; and obtain, from the first page server, the second page for caching at the first compute replica.

In embodiments, to maintain page statistics at a first compute replica of a set of compute replicas, the program code is structured to cause the processor to: create, for requests to read or write pages, access entries in a first buffer; periodically generate a timestamped snapshot of the first buffer, the timestamped snapshot comprising access entries created since a preceding snapshot; generate, based on the timestamped snapshot, timestamped access counts for the pages accessed by the requests since the preceding snapshot; and store the timestamped access counts in a second buffer.

In embodiments, to provide, to a first page server that serves the first page, a first subset of the page statistics, the program code is structured to cause the processor to: determine a page range served by the first page server; determine a subset of the timestamped access counts associated with pages within the page range; and provide, to the first page server, the subset of timestamped access counts associated with pages within the page range.

In embodiments, the first set of aggregate page statistics comprises estimated page access frequencies determined based at least on the subset of timestamped access counts and a predetermined decay rate.

In embodiments, the program code is structured to cause the processor to provide, to a first page server that serves the first page, a first subset of the page statistics responsive to at least one of: determining that a utilization of the second buffer satisfies a predetermined utilization threshold; or determining that a time elapsed since a previous providing of page statistics to the first page server satisfies a predetermined periodicity condition.

In embodiments, the program code is structured to further cause the processor to: provide, to a second page server, a second subset of the page statistics comprising page statistics associated with pages served by the second page server; receive, from the second page server, a second set of aggregate page statistics comprising, for a third page served by the second page server, an identifier of the third page and an aggregate page access frequency of the third page by the set of compute replicas; determine, based on the first set of aggregate page statistics and the second set of aggregate page statistics, an ordered list of page identifiers comprising identifiers of hot pages frequently accessed by the set of compute replicas; and iteratively populate the cache of the first compute replica until satisfaction of a predetermined termination condition by: determining whether a particular hot page identified in the ordered list of page identifiers is missing from the cache of the first compute replica, and responsive to determining that the particular hot page is missing from the cache of the first compute replica, obtaining the particular hot page for caching at the first compute replica.

In embodiments, satisfaction of a termination condition comprises at least one of: utilization of the cache of the first compute replica satisfies a predetermined percentage of a cache size of the cache of the first compute replica; caching the particular hot page missing from the cache of the first compute replica causes eviction of another page from the cache of the first compute replica; or pages identified in the ordered list of page identifiers are cached at the first compute replica.

In embodiments, a computer-readable storage medium comprises executable instructions that, when executed by a processor, cause the processor to: maintain, at a first compute replica of a set of compute replicas, page statistics associated with requests to read or write pages, the requests handled by the first compute replica; provide, to a first page server that serves a first page, a first subset of the page statistics comprising page statistics associated with the first page and an identifier of the first page; receive, from the first page server, a first set of aggregate page statistics comprising, for a second page served by the first page server, an identifier of the second page and an aggregate page access frequency of the second page by the set of compute replicas; determine that the second page is missing from a cache of the first compute replica; and obtain, from the first page server, the second page for caching at the first compute replica.

In embodiments, to maintain page statistics at a first compute replica of a set of compute replicas, the executable instructions, when executed by the processor, cause the processor to: create, for requests to read or write pages, access entries in a first buffer; periodically generate a timestamped snapshot of the first buffer, the timestamped snapshot comprising access entries created since a preceding snapshot; generate, based on the timestamped snapshot, timestamped access counts for the pages accessed by the requests since the preceding snapshot; and store the timestamped access counts in a second buffer.

In embodiments, to provide, to a first page server that serves the first page, a first subset of the page statistics, the executable instructions, when executed by the processor, cause the processor to: determine a page range served by the first page server; determine a subset of the timestamped access counts associated with pages within the page range; and provide, to the first page server, the subset of timestamped access counts associated with pages within the page range.

In embodiments, the first set of aggregate page statistics comprises estimated page access frequencies determined based at least on the subset of timestamped access counts and a predetermined decay rate.

In embodiments, the executable instructions, when executed by the processor, cause the processor to provide, to a first page server that serves the first page, a first subset of the page statistics responsive to at least one of: determining that a utilization of the second buffer satisfies a predetermined utilization threshold; or determining that a time elapsed since a previous providing of page statistics to the first page server satisfies a predetermined periodicity condition.

In embodiments, the executable instructions, when executed by the processor, further cause the processor to: provide, to a second page server, a second subset of the page statistics comprising page statistics associated with pages served by the second page server; receive, from the second page server, a second set of aggregate page statistics comprising, for a third page served by the second page server, an identifier of the third page and an aggregate page access frequency of the third page by the set of compute replicas; determine, based on the first set of aggregate page statistics and the second set of aggregate page statistics, an ordered list of page identifiers comprising identifiers of hot pages frequently accessed by the set of compute replicas; and iteratively populate the cache of the first compute replica until satisfaction of a predetermined termination condition by: determining whether a particular hot page identified in the ordered list of page identifiers is missing from the cache of the first compute replica, and responsive to determining that the particular hot page is missing from the cache of the first compute replica, obtaining the particular hot page for caching at the first compute replica.

V. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:

maintaining, at a first compute replica of a set of compute replicas, page statistics associated with requests to read or write pages, the requests handled by the first compute replica;

providing, to a first page server that serves a first page, a first subset of the page statistics corresponding to pages served by the first page server comprising page statistics associated with the first page and an identifier of the first page;

receiving, from the first page server, a first set of aggregate page statistics based on page statistics received from a plurality of compute replicas of the set of compute replicas, the first set of aggregate page statistics comprising, for a second page served by the first page server, an identifier of the second page and an aggregate page access frequency of the second page by the set of compute replicas;

determining, based on the first set of aggregate page statistics, that the second page is missing from a cache of the first compute replica; and obtaining, from the first page server, the second page for caching at the first compute replica.

2. The method of claim 1, wherein said maintaining, at a first compute replica of a set of compute replicas, page statistics comprises:

creating, for requests to read or write pages, access entries in a first buffer;

periodically generating timestamped snapshots of the first buffer, the timestamped snapshots comprising access entries created since a preceding snapshot;

generating, based on the timestamped snapshots, timestamped access counts for the pages accessed by the requests since the preceding snapshot; and storing the timestamped access counts in a second buffer.

3. The method of claim 2, wherein said providing, to a first page server that serves a first page, a first subset of the page statistics comprises:

determining a page range served by the first page server;

determining a subset of the timestamped access counts associated with pages within the page range; and providing, to the first page server, the subset of timestamped access counts associated with pages within the page range.

4. The method of claim 2, wherein the first set of aggregate page statistics comprises estimated page access frequencies determined based at least on the subset of timestamped access counts and a predetermined decay rate.

5. The method of claim 2, wherein said providing, to a first page server that serves the first page, a first subset of the page statistics is performed responsive to at least one of:

determining that a utilization of the second buffer satisfies a predetermined utilization threshold; or determining that a time elapsed since a previous providing of page statistics to the first page server satisfies a predetermined periodicity condition.

6. The method of claim 1, further comprising:

providing, to a second page server, a second subset of the page statistics comprising page statistics associated with pages served by the second page server;

receiving, from the second page server, a second set of aggregate page statistics comprising, for a third page served by the second page server, an identifier of the third page and an aggregate page access frequency of the third page by the set of compute replicas;

determining, based on the first set of aggregate page statistics and the second set of aggregate page statistics, an ordered list of page identifiers comprising identifiers of hot pages frequently accessed by the set of compute replicas; and iteratively populating the cache of the first compute replica until satisfaction of a predetermined termination condition by:

determining whether a particular hot page identified in the ordered list of page identifiers is missing from the cache of the first compute replica, and responsive to determining that the particular hot page is missing from the cache of the first compute replica, obtaining the particular hot page for caching at the first compute replica.

7. The method of claim 6, wherein said satisfaction of a termination condition comprises at least one of:

utilization of the cache of the first compute replica satisfies a predetermined percentage of a cache size of the cache of the first compute replica;

caching the particular hot page missing from the cache of the first compute replica causes eviction of another page from the cache of the first compute replica; or pages identified in the ordered list of page identifiers are cached at the first compute replica.

8. A system comprising:

a processor; and a memory device comprising program code structured to cause the processor to:

maintain, at a first compute replica of a set of compute replicas, page statistics associated with requests to read or write pages, the requests handled by the first compute replica;

provide, to a first page server that serves a first page, a first subset of the page statistics corresponding to pages served by the first page server comprising page statistics associated with the first page and an identifier of the first page;

receive, from the first page server, a first set of aggregate page statistics based on page statistics received from a plurality of compute replicas of the set of compute replicas, the first set of aggregate page statistics comprising, for a second page served by the first page server, an identifier of the second page and an aggregate page access frequency of the second page by the set of compute replicas;

determine, based on the first set of aggregate page statistics, that the second page is missing from a cache of the first compute replica; and obtain, from the first page server, the second page for caching at the first compute replica.

9. The system of claim 8, wherein, to maintain page statistics at a first compute replica of a set of compute replicas, the program code is structured to cause the processor to:

create, for requests to read or write pages, access entries in a first buffer;

periodically generate a timestamped snapshot of the first buffer, the timestamped snapshot comprising access entries created since a preceding snapshot;

generate, based on the timestamped snapshot, timestamped access counts for the pages accessed by the requests since the preceding snapshot; and store the timestamped access counts in a second buffer.

10. The system of claim 9, wherein, to provide, to a first page server that serves the first page, a first subset of the page statistics, the program code is structured to cause the processor to:

determine a page range served by the first page server;

determine a subset of the timestamped access counts associated with pages within the page range; and provide, to the first page server, the subset of timestamped access counts associated with pages within the page range.

11. The system of claim 9, wherein the first set of aggregate page statistics comprises estimated page access frequencies determined based at least on the subset of timestamped access counts and a predetermined decay rate.

12. The system of claim 9, wherein the program code is structured to cause the processor to provide, to a first page server that serves the first page, a first subset of the page statistics responsive to at least one of:

determining that a utilization of the second buffer satisfies a predetermined utilization threshold; or determining that a time elapsed since a previous providing of page statistics to the first page server satisfies a predetermined periodicity condition.

13. The system of claim 8, wherein the program code is structured to further cause the processor to:

provide, to a second page server, a second subset of the page statistics comprising page statistics associated with pages served by the second page server;

receive, from the second page server, a second set of aggregate page statistics comprising, for a third page served by the second page server, an identifier of the third page and an aggregate page access frequency of the third page by the set of compute replicas;

determine, based on the first set of aggregate page statistics and the second set of aggregate page statistics, an ordered list of page identifiers comprising identifiers of hot pages frequently accessed by the set of compute replicas; and iteratively populate the cache of the first compute replica until satisfaction of a predetermined termination condition by:

determining whether a particular hot page identified in the ordered list of page identifiers is missing from the cache of the first compute replica, and responsive to determining that the particular hot page is missing from the cache of the first compute replica, obtaining the particular hot page for caching at the first compute replica.

14. The system of claim 13, wherein said satisfaction of a termination condition comprises at least one of:

utilization of the cache of the first compute replica satisfies a predetermined percentage of a cache size of the cache of the first compute replica;

caching the particular hot page missing from the cache of the first compute replica causes eviction of another page from the cache of the first compute replica; or pages identified in the ordered list of page identifiers are cached at the first compute replica.

15. A computer-readable storage medium comprising executable instructions that, when executed by a processor, cause the processor to:

maintain, at a first compute replica of a set of compute replicas, page statistics associated with requests to read or write pages, the requests handled by the first compute replica;

provide, to a first page server that serves a first page, a first subset of the page statistics corresponding to pages served by the first page server comprising page statistics associated with the first page and an identifier of the first page;

receive, from the first page server, a first set of aggregate page statistics based on page statistics received from a plurality of compute replicas of the set of compute replicas, the first set of aggregate page statistics comprising, for a second page served by the first page server, an identifier of the second page and an aggregate page access frequency of the second page by the set of compute replicas;

determine, based on the first set of aggregate page statistics, that the second page is missing from a cache of the first compute replica; and obtain, from the first page server, the second page for caching at the first compute replica.

16. The computer-readable storage medium of claim 15, wherein, to maintain page statistics at a first compute replica of a set of compute replicas, the executable instructions, when executed by the processor, cause the processor to:

create, for requests to read or write pages, access entries in a first buffer;

periodically generate a timestamped snapshot of the first buffer, the timestamped snapshot comprising access entries created since a preceding snapshot;

generate, based on the timestamped snapshot, timestamped access counts for the pages accessed by the requests since the preceding snapshot; and store the timestamped access counts in a second buffer.

17. The computer-readable storage medium of claim 16, wherein, to provide, to a first page server that serves the first page, a first subset of the page statistics, the executable instructions, when executed by the processor, cause the processor to:

determine a page range served by the first page server;

determine a subset of the timestamped access counts associated with pages within the page range; and provide, to the first page server, the subset of timestamped access counts.

18. The computer-readable storage medium of claim 16, wherein the first set of aggregate page statistics comprises estimated page access frequencies determined based at least on the subset of timestamped access counts and a predetermined decay rate.

19. The computer-readable storage medium of claim 16, wherein the executable instructions, when executed by the processor, cause the processor to provide, to a first page server that serves the first page, a first subset of the page statistics responsive to at least one of:

determining that a utilization of the second buffer satisfies a predetermined utilization threshold; or determining that a time elapsed since a previous providing of page statistics to the first page server satisfies a predetermined periodicity condition.

20. The computer-readable storage medium of claim 15, wherein the executable instructions, when executed by the processor, further cause the processor to:

provide, to a second page server, a second subset of the page statistics comprising page statistics associated with pages served by the second page server;

receive, from the second page server, a second set of aggregate page statistics comprising, for a third page served by the second page server, an identifier of the third page and an aggregate page access frequency of the third page by the set of compute replicas;

determine, based on the first set of aggregate page statistics and the second set of aggregate page statistics, an ordered list of page identifiers comprising identifiers of hot pages frequently accessed by the set of compute replicas; and iteratively populate the cache of the first compute replica until satisfaction of a predetermined termination condition by:

determining whether a particular hot page identified in the ordered list of page identifiers is missing from the cache of the first compute replica, and responsive to determining that the particular hot page is missing from the cache of the first compute replica, obtaining the particular hot page for caching at the first compute replica.

* * * * *